United States Patent
Callcut et al.

(10) Patent No.: US 11,748,633 B2
(45) Date of Patent: Sep. 5, 2023

(54) DISTRIBUTED PRIVACY-PRESERVING COMPUTING

(71) Applicant: The Regents of the University of California, Oakland, CA (US)

(72) Inventors: Rachael A. Callcut, San Francisco, CA (US); Michael Blum, San Francisco, CA (US); Joe Hesse, San Francisco, CA (US); Robert D. Rogers, Pleasanton, CA (US); Scott Hammond, Mill Valley, CA (US); Mary Elizabeth Chalk, Austin, TX (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/988,664

(22) Filed: Nov. 16, 2022

(65) Prior Publication Data

US 2023/0080780 A1 Mar. 16, 2023

Related U.S. Application Data

(63) Continuation of application No. 16/831,763, filed on Mar. 26, 2020, now Pat. No. 11,531,904.
(Continued)

(51) Int. Cl.
*G06N 5/02* (2023.01)
*G06F 30/20* (2020.01)
(Continued)

(52) U.S. Cl.
CPC ............ *G06N 5/02* (2013.01); *G06F 16/256* (2019.01); *G06F 21/53* (2013.01); *G06F 21/602* (2013.01);
(Continued)

(58) Field of Classification Search
CPC ........ G06N 5/02; G06N 20/00; G06F 16/256; G06F 21/53; G06F 21/602; G06F 30/20; G06F 21/6245; G06F 21/74
See application file for complete search history.

(56) References Cited

U.S. PATENT DOCUMENTS 8,346,534 B2 1/2013 Csomai et al.
10,133,878 B2 11/2018 Horvitz et al.
(Continued)

FOREIGN PATENT DOCUMENTS

EP 3449414 A1 3/2019

OTHER PUBLICATIONS

"Predictive Model Markup Language," Wikipedia, XP055978337, Available Online at: https://en.Wikipedia.org/w/index.php?title=Predictive_Model_Markup_Language&oldid=840563195, May 10, 2018, pp. 1-6.
(Continued)

*Primary Examiner* — Michael R Vaughan
(74) *Attorney, Agent, or Firm* — Kilpatrick Townsend & Stockton LLP

(57) ABSTRACT

The present disclosure relates to techniques for developing artificial intelligence algorithms by distributing analytics to multiple sources of privacy protected, harmonized data. Particularly, aspects are directed to a computer implemented method that includes receiving an algorithm and input data requirements associated with the algorithm, identifying data assets as being available from a data host based on the input data requirements, curating the data assets within a data storage structure that is within infrastructure of the data host, and integrating the algorithm into a secure capsule computing framework. The secure capsule computing framework serves the algorithm to the data assets within the data storage structure in a secure manner that preserves privacy of the (Continued)

data assets and the algorithm. The computer implemented method further includes running the data assets through the algorithm to obtain an inference.

20 Claims, 12 Drawing Sheets

Related U.S. Application Data

(60) Provisional application No. 62/824,183, filed on Mar. 26, 2019, provisional application No. 62/948,556, filed on Dec. 16, 2019.

(51) Int. Cl.
  *G06F 21/53*   (2013.01)
  *G06F 21/60*   (2013.01)
  *G06N 20/00*   (2019.01)
  *G06F 16/25*   (2019.01)
  *G06F 21/62*   (2013.01)

(52) U.S. Cl.
  CPC ............ *G06F 30/20* (2020.01); *G06N 20/00* (2019.01); *G06F 21/6245* (2013.01)

(56) References Cited

U.S. PATENT DOCUMENTS

| | | | |
|---|---|---|---|
| 11,409,993 | B2 | 8/2022 | Ghosh et al. |
| 11,531,904 | B2 | 12/2022 | Callcut et al. |
| 2009/0254971 | A1 | 10/2009 | Herz et al. |
| 2017/0258390 | A1 | 9/2017 | Howard |
| 2018/0150609 | A1 | 5/2018 | Kim et al. |
| 2018/0182037 | A1 | 6/2018 | Lange et al. |
| 2018/0294047 | A1 | 10/2018 | Hosseini et al. |
| 2020/0082270 | A1 | 3/2020 | Gu et al. |
| 2020/0104705 | A1 | 4/2020 | Bhowmick et al. |
| 2020/0210867 | A1* | 7/2020 | Banis ..................... G06N 5/04 |
| 2022/0092216 | A1 | 3/2022 | Mohassel et al. |

OTHER PUBLICATIONS

U.S. Appl. No. 16/831,763, Non-Final Office Action, dated May 11, 2022, 10 pages.
U.S. Appl. No. 16/831,763, Notice of Allowance, dated Aug. 17, 2022, 12 pages.
Al-Rubaie et al., "Privacy Preserving Machine Learning: Threats and Solutions," IEEE Security & Privacy, vol. 17, No. 2, Mar.-Apr. 2019, pp. 1-18.
Application No. CA3,133,466, Office Action, dated Dec. 6, 2022, 3 pages.
Application No. EP20778145.1, Extended European Search Report, dated Nov. 17, 2022, 10 pages.
Hesamifard et al., "Privacy-Preserving Machine Learning in Cloud," In Proceedings of the 2017 on Cloud Computing Security Workshop (CCSW'17), Nov. 3, 2017, pp. 39-43.
Hunt et al., "Chiron: Privacy-Preserving Machine Learning as a Service," Cornell University Library, Mar. 15, 2018, pp. 1-15.
Hynes, "Efficient Privacy-Preserving ML Using TVM," XP055978065, Available Online at: https://tvm.apache.org/2018/10/09/ml-in-tees, Oct. 9, 2018, pp. 1-3.
Mohassel et al., "SecureML: A System for Scalable Privacy-Preserving Machine Learning," IEEE Symposium on Security and Privacy, Jun. 26, 2017, pp. 1-38.
Application No. PCT/US2020/025083, International Preliminary Report on Patentability, dated Oct. 7, 2021, 13 pages.
Application No. PCT/US2020/025083, International Search Report and Written Opinion, dated Aug. 14, 2020, 17 pages.
PCT/US2020/025083, Invitation to Pay Additional Fees and, Where Applicable, Protest Fee, May 22, 2020, 3 pages.

* cited by examiner

DISTRIBUTED PRIVACY-PRESERVING COMPUTING

CROSS-REFERENCE TO RELATED APPLICATIONS

The present application is a continuation of U.S. patent application Ser. No. 16/831,763, filed Mar. 26, 2020, entitled "DISTRIBUTED PRIVACY-PRESERVING COMPUTING ON PROTECTED DATA" which claims priority and benefit from U.S. Provisional Application No. 62/948,556, filed Dec. 16, 2019, entitled "DISTRIBUTED PRIVACY-PRESERVING COMPUTING ON PROTECTED DATA" and U.S. Provisional Application No. 62/824,183, filed Mar. 26, 2019, entitled "FEDERATED MACHINE LEARNING TECHNIQUES FOR HIGHLY CURATED HEALTHCARE DATA SETS," the entire contents of which are incorporated herein by reference for all purposes.

FIELD

The present invention relates to privacy-preserving computing, and in particular to techniques (e.g., systems, methods, computer program products storing code or instructions executable by one or more processors) for developing artificial intelligence applications and/or algorithms through the use of distributed analytics to multiple sources of privacy protected, harmonized data. The invention is particularly effective for developing artificial intelligence algorithms for regulated medical applications using privacy protected, harmonized clinical and health data.

BACKGROUND

Modern computing paradigms, including cloud computing, data parallel cluster computing, and high performance computing, combined with a widely available variety of machine learning and deep learning algorithmic architectures, have created an environment in which a vast array of artificial intelligence (AI) applications can be developed to solve problems in almost any industry, if enough data is available to optimize the underlying algorithm properly. It is now clear that access to data is the primary barrier to the development of AI applications. In fact, in many industries, it is necessary to use data from a variety of sources in order to create AI that is robust and generalizable. The challenge is that, in general, the owners of data cannot or will not share the data or allow the data to leave their control. This is understandable since data is an asset, often contains highly sensitive private and/or personal data and can be regulated in ways that make it difficult or impossible to share. These challenges are particularly difficult to overcome in the development of healthcare AI.

Of all the global stored data, about 30% resides in healthcare and it is fueling the development and funding for AI algorithms. The insights created by AI and machine learning ("ML") hold the promise of learning the associations (i.e., correlations) within complex data necessary to enhance clinical decision making, enable treatment precision, and create digital therapeutics. Healthcare AI has relevancy in the areas of biotechnology, pharmaceuticals, medical information technology, analytical and genetic testing, and medical devices. Artificial intelligence approaches, including machine learning systems, can identify patterns in complex data. In general, the higher the fidelity and diversity of the data utilized to create the algorithms and models, the more accurate and consistent the algorithms and models perform across diverse environments and populations. Thus, these AI approaches require access to diverse, high fidelity data to develop, optimize, and validate models. However, most AI algorithm developers lack healthcare data assets with sufficient fidelity and diversity to train, test and validate their algorithms and models without overcoming significant barriers to access the data. Moreover, even when AI algorithm developers have sufficient data assets, few developers perform third-party validation, resulting in algorithms and models that are essentially proof of concept studies and not solutions that can be applied in a production or clinical setting. Further development of AI models and algorithms for production or clinical use appears to be significantly hindered by a major obstacle: timely access to high fidelity, diverse, privacy-protect data.

Healthcare has regulatory, legal, and ethical requirements for maintaining the privacy of patient information. Privacy objectives include securing data against unauthorized access, providing transparency of use in accordance with an individual's privacy consent, and minimizing use of personally identifiable data whenever possible. Thus, data privacy and the protection thereof are barriers in AI which requires timely access to high fidelity, real-time, diverse data. The opportunity in healthcare AI is to utilize privacy-preserving computing to eliminate the risk of exposing identifiable information. These considerations apply to the development of AI in many industries in which the sensitivity of the data (whether it contains trade secrets or private data about individuals, for example) precludes its sharing outside the boundaries of the organization that is responsible for its protection. Accordingly, the need exists to establish privacy-preserving computing across multiple organizations to facilitate timely access to high fidelity, diverse data.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, at a data processing system, an algorithm and input data requirements associated with the algorithm, where the input data requirements include optimization and/or validation selection criteria for data assets to be run on the algorithm. The method also includes identifying, by the data processing system, the data assets as being available from a data host based on the optimization and/or validation selection criteria for the data assets. The method also includes curating, by the data processing system, the data assets within a data storage structure within infrastructure of the data host. The method also includes preparing, by the data processing system, the data assets within the data storage structure for processing by the algorithm. The method also includes integrating, by the data processing system, the algorithm into a secure capsule computing framework, where the secure capsule computing framework serves the algorithm to the data assets within the data storage structure in a secure manner that preserves privacy of the data assets and the algorithm. The method also includes running, by the data processing system, the data assets through the algorithm. Other embodiments of this aspect include corresponding computer systems, apparatus, and computer programs recorded on one or more computer storage devices, each configured to perform the actions of the methods.

Implementations may include one or more of the following features. The method where the algorithm and input data requirements are received from an algorithm developer, which is a different entity from the data host, and the optimization and/or validation selection criteria define characteristics, formats and requirements for the data assets to be run on the algorithm. The method where the characteristics and the requirements of the data assets are defined based on: (i) the environment of the algorithm, (ii) distribution of examples in the input data, (iii) parameters and types of devices generating the input data, (iv) variance versus bias, (v) tasks implemented by the algorithm, or (vi) any combination thereof. The method further including onboarding, by the data processing system, the data host, where the onboarding includes confirming that the use of the data assets with the algorithm is in compliance with data privacy requirements. The method where the preparing the data assets includes applying one or more transforms to the data assets, annotating the data assets, harmonizing the data assets, or a combination thereof. The method where the running the data assets through the algorithm includes executing a training workflow that includes: creating multiple instances of the model, splitting the data assets into sets of training data and one or more sets of testing data, training the multiple instances of the model on the sets of training data, integrating results from the training each of the multiple instances of the model into a fully federated model, running the one or more sets of testing data through the fully federated model, and computing performance of the fully federated model based on the running of the one or more sets of testing data. Implementations of the described techniques may include hardware, a method or process, or computer software on a computer-accessible medium.

Implementations may include one or more of the following features. The method where the secure capsule computing framework is provisioned within a computing infrastructure configured to accept encrypted code required to run the algorithm, and where the provisioning the computing infrastructure includes instantiating the secure capsule computing framework on the computing infrastructure, depositing, by the algorithm developer, the encrypted code inside the secure capsule computing framework, and once the secure capsule computing framework is instantiated, decrypting the encrypted code. The where the running the data assets through the algorithm includes executing a validation workflow that includes: splitting the data assets in one or more sets of validation data, running the one or more sets of validation data through the algorithm, and computing performance of the algorithm based on the running of the one or more sets of validation data. The method where the identifying is performed using differential privacy for sharing information within the data assets by describing patterns of groups within the data assets while withholding private information about individuals in the data assets, where the curating includes selecting the data storage structure from multiple data storage structures and provisioning the data storage structure within the infrastructure of the data host, and where the selection of the data storage structure is based on a type of the algorithm, a type of data within the data assets, system requirements of the data processing system, or a combination thereof. Implementations of the described techniques may include hardware, a method or process, or computer software on a computer-accessible medium.

One general aspect includes a method including: identifying a plurality of instances of an algorithm, where each instance of the algorithm is integrated into one or more secure capsule computing frameworks, where the one or more secure capsule computing frameworks serve each instance of the algorithm to training data assets within one or more data storage structures of one or more data hosts in a secure manner that preserves privacy of the training data assets and each instance of the algorithm. The method also includes executing, by a data processing system, a federated training workflow on each instance of the algorithm, where the federated training workflow takes as input the training data assets, maps features of the training data assets to a target inference using parameters, computes a loss or error function, updates the parameters to learned parameters in order to minimize the loss or error function, and outputs one or more trained instances of the algorithm. The method also includes integrating, by the data processing system, the learned parameters for each trained instance of the algorithm into a fully federated algorithm, where the integrating includes aggregating the learned parameters to obtain aggregated parameters and updating learned parameters of the fully federated algorithm with the aggregated parameters. The method also includes executing, by the data processing system, a testing workflow on the fully federated algorithm, where the testing workflow takes as input testing data, finds patterns in the testing data using the updated learned parameters, and outputs an inference. The method also includes calculating, by the data processing system, performance of the fully federated algorithm in providing the inference. The method also includes determining, by the data processing system, whether the performance of the fully federated algorithm satisfies an algorithm termination criteria. The method also includes when the performance of the fully federated algorithm does not satisfy the algorithm termination criteria, replacing, by the data processing system, each instance of the algorithm with the fully federated algorithm and re-executing the federated training workflow on each instance of the fully federated algorithm. The method also includes when the performance of the fully federated algorithm does satisfy the algorithm termination criteria, providing, by the data processing system, the performance of the fully federated algorithm and the aggregated parameters to an algorithm developer of the algorithm. Other embodiments of this aspect include corresponding computer systems, apparatus, and computer programs recorded on one or more computer storage devices, each configured to perform the actions of the methods.

Implementations may include one or more of the following features. The method where the identifying the plurality of instances of the algorithm, includes: receiving, at the data processing system, the algorithm and input data requirements associated with the algorithm, where the input data requirements include optimization and/or validation selection criteria for data assets to be run on the algorithm. The method may also include identifying, by the data processing system, the data assets as being available from the one or more data hosts based on the optimization and/or validation selection criteria for the data assets. The method may also include curating, by the data processing system, the data assets within a data storage structure that is within infrastructure of each data host of the one or more data hosts. The method may also include splitting at least a portion of the data assets into the training data assets within the data storage structure that is within the infrastructure of each data host of the one or more data hosts. The method where the algorithm and input data requirements are received from the algorithm developer, which is a different entity from the one or more data hosts, and the optimization and/or validation selection criteria define characteristics, formats and requirements for data assets to be run on the algorithm. The method where the federate training workflow further includes encrypting the training gradients, and the integrating includes decrypting the training gradients. Implementations of the described techniques may include hardware, a method or process, or computer software on a computer-accessible medium.

Implementations may include one or more of the following features. The method further including: when the performance of the fully federated algorithm does satisfy the algorithm termination criteria, transmitting, by the data processing system, aggregated parameters to each instance of the algorithm. The method may also include executing, by the data processing system, an update training workflow on each instance of the algorithm, where the update training workflow updates the learned parameters with the aggregated parameters, and outputs one or more updated and trained instances of the algorithm. The method further including running, by the data processing system, a remainder of the data assets through each instance of the algorithm. The method where the running the data assets through each instance of the algorithm includes executing a validation workflow that includes: further splitting at least a portion of the data assets into one or more sets of validation data, running the one or more sets of validation data through each instance of the algorithm, and computing performance of each instance of the algorithm based on the running of the one or more sets of validation data. Implementations of the described techniques may include hardware, a method or process, or computer software on a computer-accessible medium.

One general aspect includes a method including: identifying, by a data processing system, data assets available from a data host based on selection criteria for the data assets. The method also includes curating, by the data processing system, the data assets within a data storage structure that is within infrastructure of the data host. The method also includes preparing, by the data processing system, a transformer prototype set of data to use as a guide for developing algorithms for data transformation, where the transformer prototype set of data captures key attributes of a harmonization process. The method also includes creating, with the data processing system, a first set of harmonizing transformers for transformation of the data assets based on a present format of data in the transformer prototype set of data. The method also includes applying, by the data processing system, the first set of harmonizing transformers to the data assets to generate transformed data assets. The method also includes preparing, by the data processing system, a harmonization prototype set of data to use as a guide for developing algorithms for data transformation, where the harmonization prototype set of data captures key attributes of the harmonization process. The method also includes creating, by the data processing system, a second set of harmonizing transformers for transformation of the transformed data assets based on a present format of data in the harmonization prototype set of data. The method also includes applying, by the data processing system, the second set of harmonizing transformers to the transformed data assets to generate harmonized data assets. The method also includes running, by the data processing system, the harmonized data assets through an algorithm, where the algorithm is in a secure capsule computing framework that serves the algorithm to the harmonized data assets within the data storage structure in a secure manner that preserves privacy of the harmonized data assets and the algorithm. Other embodiments of this aspect include corresponding computer systems, apparatus, and computer programs recorded on one or more computer storage devices, each configured to perform the actions of the methods.

Implementations may include one or more of the following features. The method where the selection criteria are received from an algorithm developer, which is a different entity from the data host, and the selection criteria define characteristics, formats and requirements for the data assets to be run on the algorithm. The method where the characteristics and the requirements of the data assets are defined based on: (i) the environment of the algorithm, (ii) distribution of examples in the input data, (iii) parameters and types of devices generating the input data, (iv) variance versus bias, (v) tasks implemented by the algorithm, or (vi) any combination thereof. The method further including de-identifying the transformer prototype set of data and making the de-identified transformer prototype set of data available to the algorithm developer for the purpose of creating the first set of harmonizing transformers for transformation of the data assets. The method where applying the first set of harmonizing transformers to the data assets is performed within the data structure. The method further including annotating, with the data processing system, the transformed data assets according to a predefined annotation protocol to generate annotated data sets, where the annotating the transformed data is performed within the data structure, and the second set of harmonizing transformers is applied to the annotated data sets to generate harmonized data assets. The method where the applying the second set of harmonizing transformers to the annotated data assets is performed within the data structure. The method further including determining whether the first set of harmonizing transformers, the annotations, and the second set of harmonizing transformers are applied successfully and applied without violating data privacy requirements. Implementations of the described techniques may include hardware, a method or process, or computer software on a computer-accessible medium.

One general aspect includes a method including: identifying an algorithm or model, where the algorithm or model is integrated into a secure capsule computing framework, where the secure capsule computing framework serves the algorithm or model to training data assets within the data storage structures of a data host in a secure manner that preserves privacy of the training data assets and the algorithm or mode. The method also includes executing, by a data processing system, a federated training workflow on the algorithm or model, where the federated training workflow takes as input the training data assets, maps features of the training data assets to a target inference using parameters, computes a loss or error function, updates the parameters to learned parameters in order to minimize the loss or error function, and outputs a trained algorithm or model. The method also includes integrating, by the data processing system, the learned parameters for the algorithm or model into a fully federated algorithm or model, where the integrating includes aggregating the learned parameters to obtain aggregated parameters and updating learned parameters of the fully federated algorithm or model with the aggregated parameters. The method also includes executing, by the data processing system, a testing workflow on the fully federated algorithm or model, where the testing workflow takes as input testing data, finds patterns in the testing data using the updated learned parameters, and outputs an inference. The method also includes calculating, by the data processing system, performance of the fully federated algorithm in providing the inference. The method also includes determining, by the data processing system, whether the performance of the fully federated algorithm or model satisfies an algorithm termination criteria. The method also includes when the performance of the fully federated algorithm or model does not satisfy the algorithm termination criteria, replacing, by the data processing system, the algorithm or model with the fully federated algorithm or model and re-executing the federated training workflow on the fully federated algorithm or model. The method also includes when the performance of the fully federated algorithm or model does satisfy the algorithm termination criteria, providing, by the data processing system, the performance of the fully federated algorithm or model and the aggregated parameters to an algorithm developer of the algorithm or model. Other embodiments of this aspect include corresponding computer systems, apparatus, and computer programs recorded on one or more computer storage devices, each configured to perform the actions of the methods.

Implementations may include one or more of the following features. The method where the identifying the algorithm includes: receiving, at the data processing system, the algorithm and input data requirements associated with the algorithm, where the input data requirements include validation selection criteria for data assets to be run on the algorithm. The method may also include identifying, by the data processing system, the data assets as being available from a data host based on the validation selection criteria for the data assets. The method may also include curating, by the data processing system, the data assets within a data storage structure that is within infrastructure of the data host. The method may also include splitting at least a portion of the data assets into the validation data assets within the data storage structure that is within the infrastructure of the data host. The method further including: onboarding, by the data processing system, the data host, where the onboarding includes confirming that the use of the data assets with the algorithm is in compliance with data privacy requirements. The method may also include completing governance and compliance requirements including clearance from an institutional review board use of the data assets from the data host for purposes of validating the algorithm. The method may also include where the curating includes selecting the data storage structure from multiple data storage structures and provisioning the data storage structure within the infrastructure of the data host, where the selection of the data storage structure is based on a type of algorithm within the algorithm, a type of data within the data assets, system requirements of the data processing system, or a combination thereof. The method further including when the performance of the algorithm does satisfy the validation criteria, maintaining, by the data processing system, the algorithm and the validation data assets in a secure manner that preserves privacy of the validation data assets and the algorithm. The method where the validation data assets are a plurality of disjoint sets of data assets, the encrypted code is signed by the data processing system and stored in an data storage archive, and the performance of the algorithm is provided as a single validation report for validation of the algorithm aggregated from a plurality of validations performed on the plurality of disjoint sets of data assets. Implementations of the described techniques may include hardware, a method or process, or computer software on a computer-accessible medium.

One general aspect includes a method including: identifying an algorithm, where the algorithm is provided by an algorithm developer and integrated into a secure capsule computing framework, where the secure capsule computing framework serves the algorithm to validation data assets within a data storage structure in a secure manner that preserves privacy of the validation data assets and the algorithm. The method also includes executing, by a data processing system, a validation workflow on the algorithm, where the validation workflow takes as input the validation data assets, applies the algorithm to the validation data assets using learned parameters, and outputs an inference. The method also includes calculating, by the data processing system, performance of the algorithm in providing the inference, where the performance is calculated based on gold standard labels. The method also includes determining, by the data processing system, whether the performance of the algorithm satisfies validation criteria defined by an algorithm developer. The method also includes when the performance of the algorithm does not satisfy the validation criteria, optimizing, with the data processing system, one or more hyperparameters of the algorithm and re-executing the validation workflow on the algorithm with the optimized one or more hyperparameters. The method also includes when the performance of the algorithm does satisfy the validation criteria, providing, by the data processing system, the performance of the algorithm and the one or more hyperparameters to the algorithm developer. Other embodiments of this aspect include corresponding computer systems, apparatus, and computer programs recorded on one or more computer storage devices, each configured to perform the actions of the methods.

Implementations may include one or more of the following features. The method where the validation selection criteria includes clinical cohort criteria, demographic criteria, and/or data set class balance, and where the clinical cohort criteria define a group of people that the data assets are to be obtained from for a cohort study, a type of the cohort study, risk factors that the group of people may have exposure to over a period of time, question or hypothesis to be solved and associated disease or condition, other parameters that define criteria for the cohort study, or any combination thereof. The method where the secure capsule computing framework is provisioned within a computing infrastructure configured to accept encrypted code required to run the algorithm, and where the provisioning the computing infrastructure includes instantiating the secure capsule computing framework on the computing infrastructure, depositing, by the algorithm developer, the encrypted code inside the secure capsule computing framework, and once the secure capsule computing framework is instantiated, decrypting the encrypted code. Implementations of the described techniques may include hardware, a method or process, or computer software on a computer-accessible medium.

One general aspect includes a method including: receiving, at a data processing system, an algorithm and input data requirements associated with the algorithm, where the input data requirements include validation selection criteria for data assets to be run on the algorithm. The method also includes identifying, by the data processing system, the data assets as being available from a data host based on the validation selection criteria for the data assets. The method also includes curating, by the data processing system, the data assets within a data storage structure within infrastructure of the data host. The method also includes preparing, by the data processing system, the data assets within the data storage structure for processing by the algorithm. The method also includes integrating, by the data processing system, the algorithm into a secure capsule computing framework, where the secure capsule computing framework serves the algorithm to the data assets within the data storage structure in a secure manner that preserves privacy of the data assets and the algorithm. The method also includes executing, by the data processing system, a validation workflow on the algorithm, where the validation workflow takes as input the data assets, finds patterns in the data assets using learned parameters, and outputs an inference. The method also includes calculating, by the data processing system, performance of the algorithm in providing the inference, where the performance is calculated based on gold standard labels. The method also includes providing, by the data processing system, the performance of the algorithm to the algorithm developer. Other embodiments of this aspect include corresponding computer systems, apparatus, and computer programs recorded on one or more computer storage devices, each configured to perform the actions of the methods.

Implementations may include one or more of the following features. The method where the validation selection criteria includes clinical cohort criteria, demographic criteria, and/or data set class balance, and where the clinical cohort criteria define a group of people that the data assets are to be obtained from for a cohort study, a type of the cohort study, risk factors that the group of people may have exposure to over a period of time, question or hypothesis to be solved and associated disease or condition, other parameters that define criteria for the cohort study, or any combination thereof. The method further including: onboarding, by the data processing system, the data host, where the onboarding includes confirming that the use of the data assets with the algorithm is in compliance with data privacy requirements. The method may also include completing governance and compliance requirements including clearance from an institutional review board use of the data assets from the data host for purposes of validating the algorithm. The method may also include where the curating includes selecting the data storage structure from multiple data storage structures and provisioning the data storage structure within the infrastructure of the data host, where the selection of the data storage structure is based on a type of algorithm within the algorithm, a type of data within the data assets, system requirements of the data processing system, or a combination thereof. The method further including: maintaining, by the data processing system, the algorithm and the data assets in a secure manner that preserves privacy of the data assets and the algorithm. Implementations of the described techniques may include hardware, a method or process, or computer software on a computer-accessible medium.

Implementations may include one or more of the following features. The method where the secure capsule computing framework is provisioned within a computing infrastructure configured to accept encrypted code required to run the algorithm, and where the provisioning the computing infrastructure includes instantiating the secure capsule computing framework on the computing infrastructure, depositing, by the algorithm developer, the encrypted code inside the secure capsule computing framework, and once the secure capsule computing framework is instantiated, decrypting the encrypted code. Other embodiments of this aspect include corresponding computer systems, apparatus, and computer programs recorded on one or more computer storage devices, each configured to perform the actions of the methods. The method where the data assets are a plurality of disjoint sets of data assets, the encrypted code is signed by the data processing system and stored in an data storage archive, and the performance of the algorithm is provided as a single validation report for validation of the algorithm aggregated from a plurality of validations performed on the plurality of disjoint sets of data assets. Implementations of the described techniques may include hardware, a method or process, or computer software on a computer-accessible medium.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims

BRIEF DESCRIPTION OF THE DRAWINGS

The present invention will be better understood in view of the following non-limiting figures, in which.

DETAILED DESCRIPTION

I. Introduction

Figure 1:
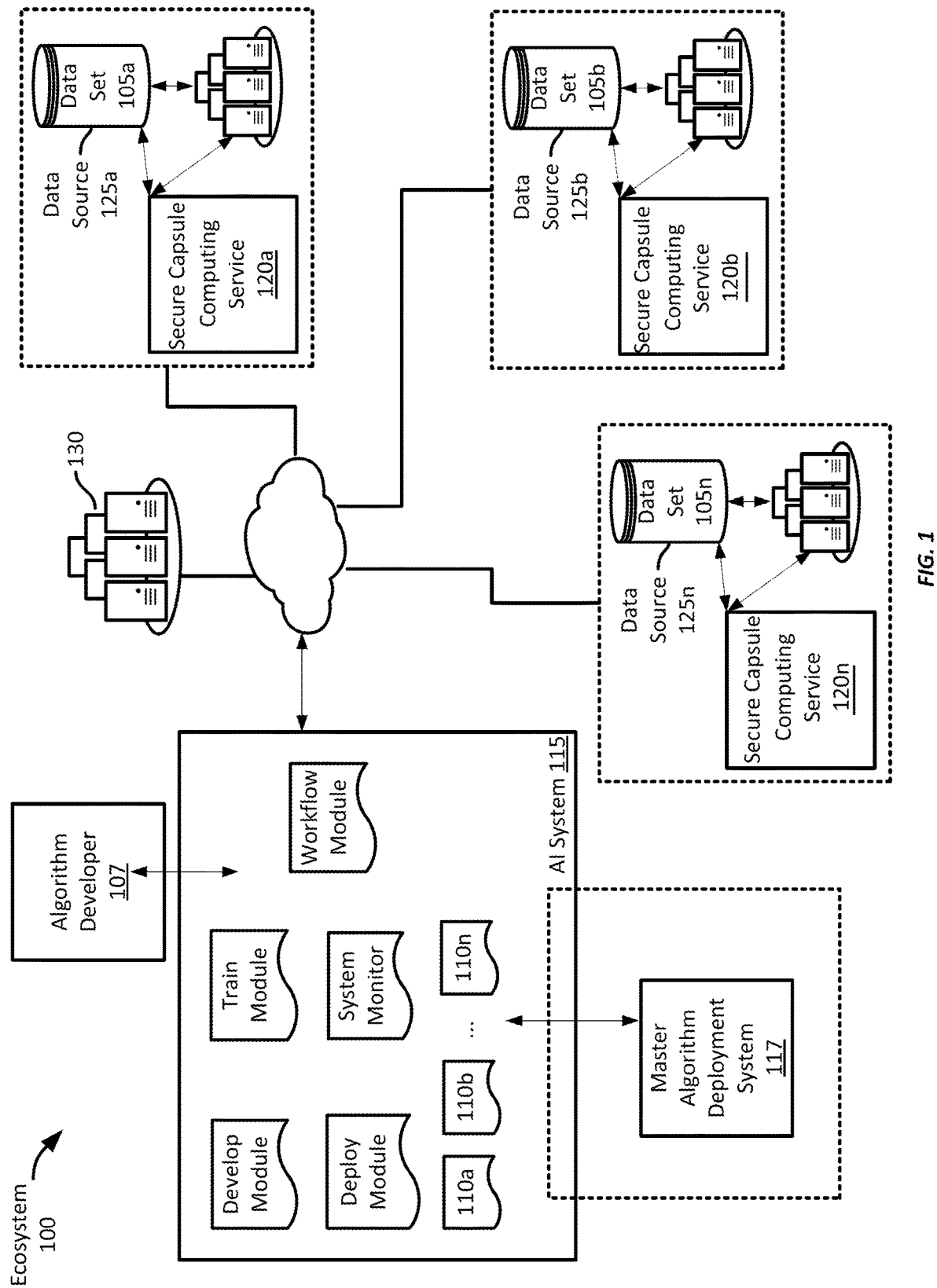
FIG. 1 shows an AI ecosystem in accordance with various embodiments.

The present disclosure describes techniques for developing AI applications and/or algorithms by distributing analytics to multiple sources of privacy protected, harmonized data (for example, clinical and health data). More specifically, some embodiments of the present disclosure provide an AI algorithm development platform that accelerates application and/or algorithm development (which may be referred to herein individually or collectively as algorithm development) by distributing analytics to multiple sources of privacy protected, harmonized data (for example, clinical and health data). It should be appreciated that although various embodiments of machine learning and algorithmic architecture are disclosed herein in which AI algorithms are developed to solve problems in the health care industry, these architectures and techniques can be implemented in other types of systems and settings. For example, these architectures and techniques can be implemented in the development of AI algorithms in many industries (financial, life sciences, supply chain, national security, law enforcement, public safety, etc.) in which the sensitivity of the data (whether it contains trade secrets or private data about individuals, for example) precludes sharing of the data outside the boundaries of the organization that is responsible for its protection.

Various embodiments disclosed herein describe techniques for algorithm and model development including training, testing, optimization, and validation. The terms "algorithm(s)" and "model(s)" are used in the detail description (not the claims) interchangeably for readability and brevity, and thus in instances herein where the term "algorithm(s)" is used it could be replaced with the term "model(s)" and in instances where the term "model(s)" is used it could be replaced with the term "algorithm(s)". However, it should be understood these terms do have separate meanings: "algorithm(s)" are functions, methods, or procedures that are implemented to complete a task or solve a problem; whereas "model(s)" are well-defined computations comprised of one or more algorithms and take some value, or set of values, as input and produce some value, or set of values as output. For example, in order to find the value of y for a certain value of x in an instance where the variables are linearly related, an algorithm such as $y=mx+b$ may be used to describe the linear relationship between the x and y variables. A model having values for slope (m) and intercept (c) may be trained, tested, optimized, or validated, and thereafter the model may be used to find values of y for different points of x using the algorithm $y=mx+b$ and values for slope (m) and intercept (c). Typically regulated AI and ML algorithms (for example, those intended for use in healthcare applications) should perform in a manner that is generalizable and therefore agnostic to details such as ethnicity, application environment and workflow (for example a specific clinical environment) and geography, irrespective of the environment in which the algorithm is used. In order to achieve consistent performance, algorithms should have timely access to highly diverse data to enable discovery, optimization, and validation.

One of the greatest barriers to discovery, optimization, and validation of regulated AI and ML algorithms is the lack of timely access to highly diverse data, which in many instances is privacy-protected data. Privacy-protected data is legally protected, viewed as an organizational asset by institutions, resides in isolated repositories with different "owners", and, even when an algorithm developer gains access to the data, it is likely to not be in a computable form. Within the healthcare industry, the problem is widely understood as highlighted by Francis Collins, MD, PhD, the Director of the National Institutes of Health (NIH) in his July 2018 presentation to the NIH Workshop on Harnessing Artificial Intelligence and Machine Learning to Advance Biomedical Research in which he said, "Many researchers invest a significant amount of time in accessing the data and making it analyzable; this aspect needs to be improved." In addition, in its "Strategic Plan for Data Science," the NIH recognized that, "there is currently no general system to transform, or harden, innovative algorithms and tools . . . into enterprise-ready resources that meet industry standards of ease of use and efficiency of operation." These challenges apply broadly across industries in which data assets are distributed in different locations and contain sensitive or private data.

The key roles in developing AI solutions include: the algorithm developer, the data provider, third-party annotators, third-party validator(s), algorithm regulatory body(ies), and the end user or customer (e.g., healthcare organizations). As an example of the complexity of the process of developing algorithms in a regulated environment (such as would be the case for healthcare, finance, law enforcement, education, and many others), consider the current process for companies developing AI or ML regulated algorithms for healthcare. Such companies typically undergo a lengthy process to create an algorithm that meets industry standards. The process may include securing data providers, establishing a technical environment, establishing security and privacy reviews, preparing the data (e.g., curation and de-identification), transferring the deidentified data to the algorithm developers, application of the AI or ML to the deidentified data for algorithm discovery and development, documenting results of the algorithm discovery and development, and submission of the algorithm or model to a regulatory body (e.g., the Food and Drug Administration (FDA)) for review and approval. This process contains a number of privacy threats including reconstruction attacks (reconstructing raw private data from exposed features extracted from raw data), model inversion attacks (creating feature vectors utilizing responses received from a model), membership inference attacks (determine if a sample was a member of the training set used to build a ML model), and the re-identification of private data.

Many conventional privacy-enhancing techniques concentrate on allowing data providers and algorithm developers to utilize secure communications, cryptographic approaches, or differentially-private data release (perturbation techniques) to overcome or minimize these privacy threats. For example, differential privacy is effective in preventing membership inference attacks. Additionally, the success of model inversion and membership inference attacks can be decreased by limiting the model inference output (e.g. class labels only). Despite the aforementioned techniques to protect the private data while performing discovery, optimization, and validation, many algorithm developers avoid the use of privacy-protected data (including clinical data from healthcare institutions) due to increased time to market, costs, and increased complexity of algorithm development which thereby builds in an inherent bias due to its lack of fidelity (including clinical) and produces algorithms that are essentially proof of concept studies rather than real-world research that results in creating AI for use in privacy sensitive industries. For example, the timeline to complete the required steps to secure privacy-protected data outstrips the typical venture investment return expectations. The capital markets have experienced the timeliness with which industries who utilize less sensitive data produce algorithms and expect the same in privacy sensitive industries (including healthcare). For example, this lack of patience to achieve a return will mean that most investments in healthcare AI will fall short of the mark as early stage companies run out of cash to continue with multi-site training required for clinically deployed algorithms.

To address these problems, various embodiments are directed to a platform and techniques for developing artificial intelligence applications by distributing analytics to multiple sources of privacy protected, harmonized clinical and health data. For example, in the context of healthcare AI algorithm development, the platform may include a group of participating healthcare data provider organizations from around the world who collectively represent ethnic and equipment diverse data. This group may participate in a centralized contracting and pricing model enabling an algorithm developer to establish one contract to access multiple sources of data. The establishment within the platform of a shared technical infrastructure for data harmonization, annotation, validation and federated training may enable the algorithm developer to gain access to multiple sources of data in a single development and deployment environment. The multi-organization collaboration may have the ability to adopt standardized security and privacy review that will be centralized under the collaboration enabling the algorithm developer to fulfill a single standardized security and privacy review that would be applicable across multiple organizations. Data preparation may include: adopting a standardized multi-organizational Institutional Review Board Approval (IRB) (utilized in the context of life science companies) format eliminating the redundancy of working with multiple organizations; and developing curation, deidentification, and augmentation tools and workflows to perform and debug data curation, deidentification, transformation, and augmentation in a manner that does not expose algorithm developers to underlying data sets, protecting the underlying assets (the tools developed for one data host may be reused or modified for reuse with data from additional data hosts). Prepare data to be used for discovery, validation or training of algorithms is never transferred from the control of the original data owner. The software components responsible for carrying out discovery, validation and/or training are run in an encapsulated format within infrastructure controlled by the data host. This infrastructure can be on premises or on the cloud but is entire within the domain control of the data host.

The platform provides a secure capsule computing services framework to apply AI or ML to the prepared data in a privacy preserving manner. In some instances, technical calibration is performed as part of this process but may also be initially performed on a small portion of the prepared data in an iterative process to ensure that the end-to-end computational pipeline is complete. Because these steps operate within the standardized infrastructure of the platform, this process may be managed by the platform rather than by employees of the data host. This means the process is repeatable and scalable and is performed by individuals who are well trained and familiar with the process. Application of AI or ML to the prepared data may include algorithm discovery, algorithm optimization, and or algorithm validation.

In some instances, the operation of algorithm discovery may be implemented entirely within the technical control of the data host, which allows for a range of levels of protection of the underlying data. Certain types of algorithm development activity may be protected using differential privacy techniques to ensure minimal risk of data leakage. Depending upon the level of trust between parties, new algorithm discovery methods may be enabled through extensive monitoring of algorithmic activity and outgoing traffic from the encapsulated software running in the data host environment. One illustrative embodiment of the present disclosure comprises: receiving, at a data processing system, an algorithm or model and input data requirements associated with the algorithm or model, where the input data requirements include optimization and/or validation selection criteria for data assets to be run on the algorithm or model; identifying, by the data processing system, the data assets as being available from a data host based on the optimization and/or validation selection criteria for the data assets; curating, by the data processing system, the data assets within a data storage structure within infrastructure of the data host; preparing, by the data processing system, the data assets within the data storage structure for processing by the algorithm or model; integrating, by the data processing system, the algorithm or model into a secure capsule computing framework, where the secure capsule computing framework serves the algorithm or model to the data assets within the data storage structure in a secure manner that preserves privacy of the data assets and the algorithm or model; and running, by the data processing system, the data assets through the algorithm or model.

In some instances, the optimization may be performed entirely within the infrastructure and control of the data host, with no outside sharing of data required. Depending on the security level chosen by the data host, it is possible to support algorithm optimization with no possibility of leakage of training data (for example, using homomorphic encryption and refactored algorithms). All tools for cohort development may be managed with strict differential privacy controls to prevent reconstruction, differencing, tracing and other attacks on private data. One illustrative embodiment of the present disclosure comprises: identifying an algorithm or model, where the algorithm or model is integrated into a secure capsule computing framework, where the secure capsule computing framework serves the algorithm or model to training data assets within the data storage structures of a data host in a secure manner that preserves privacy of the training data assets and the algorithm or mode; executing, by a data processing system, a federated training workflow on the algorithm or model, where the federated training workflow takes as input the training data assets, maps features of the training data assets to a target inference using parameters, computes a loss or error function, updates the parameters to learned parameters in order to minimize the loss or error function, and outputs a trained algorithm or model; integrating, by the data processing system, the learned parameters for the algorithm or model into a fully federated algorithm or model, where the integrating comprises aggregating the learned parameters to obtain aggregated parameters and updating learned parameters of the fully federated algorithm or model with the aggregated parameters; executing, by the data processing system, a testing workflow on the fully federated algorithm or model, where the testing workflow takes as input testing data, finds patterns in the testing data using the updated learned parameters, and outputs an inference (a conclusion (e.g., a prediction of a model or a result of an algorithm) obtained based on the input data, learned parameters, and configuration of the algorithm or model); calculating, by the data processing system, performance of the fully federated algorithm in providing the inference; determining, by the data processing system, whether the performance of the fully federated algorithm or model satisfies an algorithm termination criteria; when the performance of the fully federated algorithm or model does not satisfy the algorithm termination criteria, replacing, by the data processing system, the algorithm or model with the fully federated algorithm or model and re-executing the federated training workflow on the fully federated algorithm or model; and when the performance of the fully federated algorithm or model does satisfy the algorithm termination criteria, providing, by the data processing system, the performance of the fully federated algorithm or model and the aggregated parameters to an algorithm developer of the algorithm or model.

In some instances, validation may be performed entirely within the infrastructure and control of the data host, with no outside sharing of data required. There is no possibility of leakage of validation data and all tools for cohort development are managed with strict differential privacy controls to prevent reconstruction, differencing, tracing and other attacks on private data. One illustrative embodiment of the present disclosure comprises: receiving, at a data processing system, an algorithm and input data requirements associated with the algorithm, where the input data requirements include validation selection criteria for data assets to be run on the algorithm; identifying, by the data processing system, the data assets as being available from a data host based on the validation selection criteria for the data assets; curating, by the data processing system, the data assets within a data storage structure within infrastructure of the data host; preparing, by the data processing system, the data assets within the data storage structure for processing by the algorithm; integrating, by the data processing system, the algorithm into a secure capsule computing framework, wherein the secure capsule computing framework serves the algorithm to the data assets within the data storage structure in a secure manner that preserves privacy of the data assets and the algorithm; and executing, by the data processing system, a validation workflow on the algorithm, where the validation workflow takes as input the validation data assets, finds patterns in the validation data assets using learned parameters, and outputs an inference; calculating, by the data processing system, performance of the algorithm in providing the inference, wherein the performance is calculated based on gold standard labels; and providing, by the data processing system, the performance of the algorithm to the algorithm developer. A key requirement for those algorithms or models requiring regulatory submission is often validation of algorithms or models on diverse, disjoint data sets from different geographies. Because the platform performs validation on disjoint data sets with consistent operating parameters and validation reports, and because the platform reports on the underlying characteristics of each data set (demographics, equipment used, protocol used to collect data), it is dramatically easier, faster and less expensive to complete the validation necessary for most regulatory submissions.

Advantageously, these techniques allow for the deployment of a privacy-preserving, distributed platform to support multi-site development of algorithms and models. Further, these techniques can help algorithm developers accelerate algorithm or model time to market, optimize commercial viability, and de-risk investment in algorithms and models that utilize private data. Further, these techniques can help data hosts to optimize the value of their data assets in ways that protect the privacy of individuals whose data is represented in the applicable data sets, help optimize patient outcomes (in healthcare applications), and create innovative thought leadership in the field.

II. Artificial Intelligence (AI) Ecosystem

FIG. 1 shows an AI ecosystem 100 that allows for secure, federated computing on private data sets 105$a$-$n$ ('n' represents any natural number), including augmentation of data from data sets 105$a$-$n$, algorithm/model 110$a$-$n$ deployment, algorithm/model 110$a$-$n$ validation, algorithm/model 110$a$-$n$ optimization (training/testing), and federated training of algorithms/models 110$a$-$n$ on multiple data sets 105$a$-$n$. The AI development platform 110 includes AI system 115 and secure capsule computing services 120$a$-$n$. The AI system 115 manages the development and deployment of software assets in the AI ecosystem 100. Various software modules, including pre-trained algorithms/models 110$a$-$n$ for training, optimization, scoring and validation, and algorithm training code (to train algorithms/models on data) are developed and deployed through the AI system 115. For example, the AI system 115 may deploy or output the various software components to one or more secure capsule computing services 120$a$-$n$. The secure capsule computing services 120$a$-$n$ are encapsulated or otherwise portable software components that can be computed upon in a secure capsule computing service environment entirely within the computing domain of the data host.

Secure capsule computing services facilitate the deployment of software, including algorithms to be validated and/or trained, to external environments (in this case, the computing environment of the data host) and additionally provide security services to protect both the privacy of the software deployed within the capsule, and the security of the host computing environment. In different embodiments, encryption, secure capsule computing framework, isolation, obfuscation and other methods may be employed to provide security for all parties. For example, in some instances it can be critical to an algorithm developer that the organization that is running the software in the secure encapsulated computing module (e.g. data host) not be able to inspect, copy or modify the algorithm developer's proprietary software. Secure encapsulated computing services provide a portable environment to support such a computing model. Furthermore, in many cases, the stakeholder that is running the secure encapsulated computing services will want protection against the possibility that the software being hosted is malicious and could harm the host's infrastructure or compromise data privacy. Additionally, the AI system 115 may deploy or output data resources, model parameters, or shared data for training (e.g., parent-teacher training paradigm). In return, the AI system 115 may receive input including computing results, data, and computing monitoring results, trained models, model parameters, or other results of deployed computing components and processes such as secure capsule computing services 120a-n.

The secure capsule computing services 120a-n may provide the same or different functions or operations. For example, secure capsule computing services 120a and 120n may manage data transformations and computing activities; however, they may implement different functions or operations in performing the computing activities. The secure capsule computing service 120a may receive data and software from the AI system 100 and uncurated data from data sources 125a-n (e.g., data sources 120a and 120b). Data may be imported, optionally stored, transformed and otherwise harmonized and then computed upon by software (e.g., the algorithms/models 110a-n) from the AI system 100. In contrast, the secure capsule computing service 120n may receive data and software from the AI system 100, uncurated data from data sources 125a-n (e.g., data sources 120a and 120b), and join data from one or more third parties 130. Data may be imported, optionally stored, transformed, joined with join data, and otherwise harmonized and then computed upon by software (e.g., the algorithms/models 110a-n) from the AI system 100. The secure capsule computing services 120a-n are in communication with the data sources 125a-n and optionally third parties 130 via a communications network 135. Examples of communication networks 135 may include a mobile network, a wireless network, a cellular network, a area network (LAN), a wide area network (WAN), other wireless communication networks, or combinations thereof.

Figure 2:
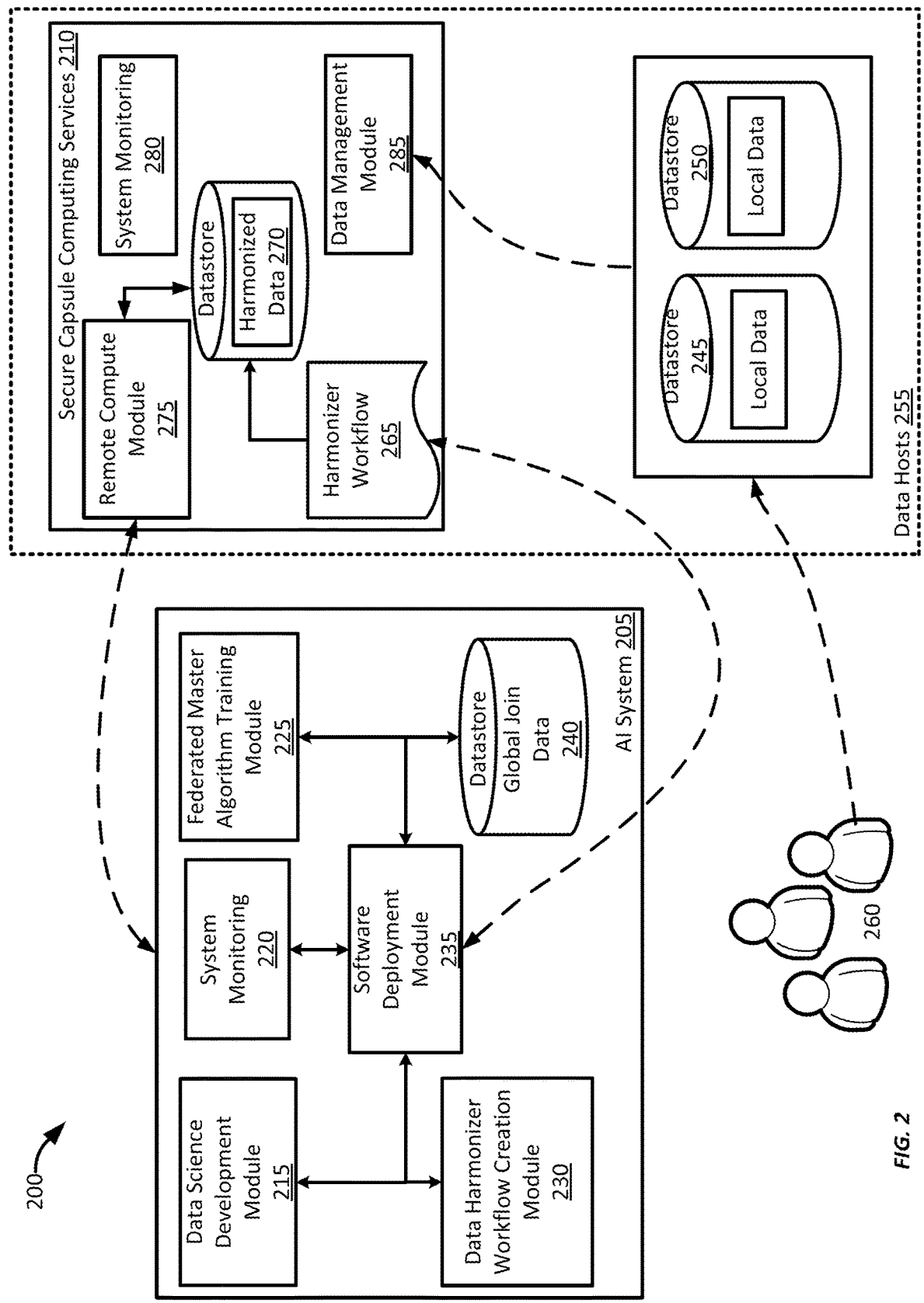
FIG. 2 shows an AI algorithm development platform in accordance with various embodiments.

FIG. 2 shows an AI algorithm development platform 200 (e.g., a data processing system implemented within AI ecosystem 100 described with respect to FIG. 1) for developing artificial intelligence algorithms by distributing analytics to multiple sources of privacy protected, harmonized data. In some instances, the platform 200 includes AI system 205 in communication with a network of secure capsule computing services 210 (only one secure capsule computing service is shown for simplicity). The AI system 205 may include a data science development module 215, a data harmonizer workflow creation module 220, a software deployment module 225, a federated master algorithm training module 230, a system monitoring module 235, and a data store comprising global join data 240. The AI system 205 may be in communication with one or more algorithm developers and is configured to receive one or more algorithms or models to be optimized and/or validated in a new project.

The data science development module 215 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 220 may be configured to manage transformation, harmonization, and annotation protocol development and deployment. The software deployment module 225 may be configured along with the data science development module 215 and the data harmonizer workflow creation module 220 to assess data assets for use with one or more models. This process can be automated or can be an interactive search/query process. The software deployment module 225 may be further configured along with the data science development module 215 to integrate the models into a secure capsule computing framework, along with required libraries and resources.

In some embodiments, it is desired to develop a robust, superior algorithm/model that has learned from multiple disjoint private data sets 245, 250 (e.g., clinical and health data) collected by data hosts 255 from sources 260 (e.g., patients). The federated master algorithm training module 230 may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 235 monitors activity in secure capsule computing services 210. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets 245, 250 with additional data 240 (join data). For example, geolocation air quality data could be joined with geolocation data of patients to ascertain environmental exposures. In certain instances, join data 240 may be transmitted to secure capsule computing services 210 to be joined with data 245, 250 during data harmonization or computation.

The secure capsule computing services 210 may include a harmonizer workflow module 265, harmonized data 270, a remote compute module 275, a system monitoring module 280, and a data management module 285. The transformation, harmonization, and annotation workflows managed by the data harmonizer workflow creation module 230 may be deployed by and performed in the environment by harmonizer workflow module 265 using transformations and harmonized data 270. In some instances, the join data 240 may be transmitted to the harmonizer workflow module 265 to be joined with data 245, 250 during data harmonization. The remote compute module 275 may be configured to run the private data sets 245, 250 through the algorithm/model. In some embodiments, the running comprises executing a training workflow that includes: creating multiple instances of the algorithm/model, splitting the private data sets 245, 250 into sets of training data and one or more sets of testing data, training the multiple instances of the algorithm/model on the sets of training data, integrating results from the training each of the multiple instances of the model into a fully federated algorithm/model, running the one or more sets of testing data through the fully federated algorithm/model, and computing performance of the fully federated model based on the running of the one or more sets of testing data. In other embodiments, the running comprises executing a validation workflow that includes: splitting, combining and/or transforming the private data sets 245, 250 into one or more sets of validation data, running the one or more sets of validation data through the machine-learning algorithm/model, and computing performance of the machine-learning algorithm/model based on the running of the one or more sets of validation data. In some instances, the join data 240 may be transmitted to the remote compute module 275 to be joined with data 245, 250 during computation.

The system monitoring module 280 monitors activity in the secure capsule computing service 210. Monitored activity may include operational tracking such as algorithm/model intake, workflow configuration, and data host onboarding, as required by each use case and embodiment. The data management module 285 may be configured to import data assets such as private data sets 245, 250 from data hosts 255 while maintaining the data assets within the pre-exiting infrastructure of the data hosts 255.

III. Techniques for Optimizing and/or Validating Models

Figure 3:
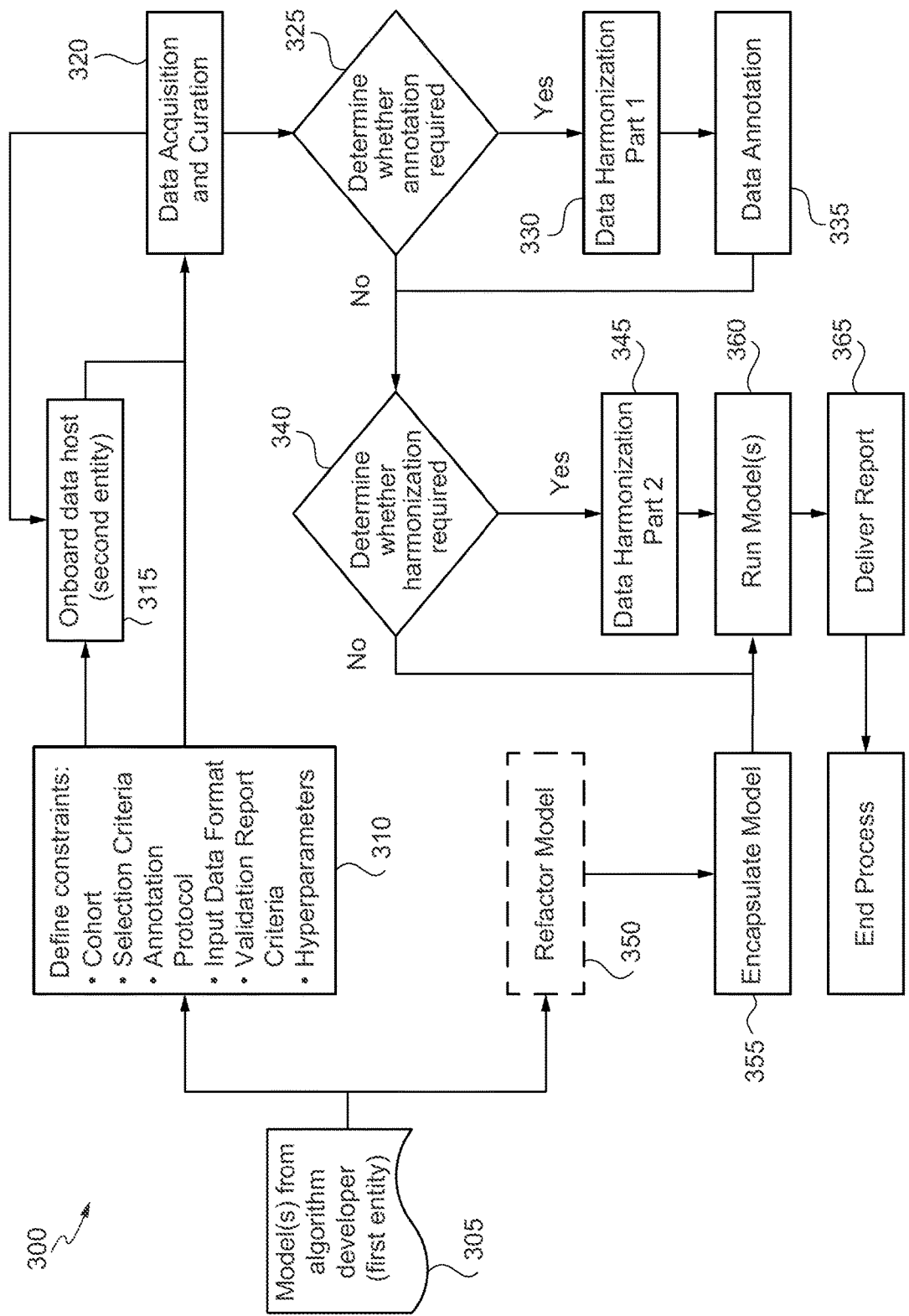
FIG. 3 shows a core process for optimizing and/or validating the models on data (for example, clinical and health data) in accordance with various embodiments.

In various embodiments, techniques are provided for optimizing and validating one or more models using on one or more sources of privacy protected, harmonized data (e.g., harmonized clinical and health data). The models may be provided by a first entity (e.g., an algorithm developer such as a life science company) and the data sets may be provided by a second entity (e.g., a data host such as an academic medical center). For example, life science companies may be interested in accelerating time to market or optimizing commercial viability of products and services by optimizing or evaluating execution performance of their models on one or more sources of privacy protected, harmonized clinical and health data. Additionally, academic medical centers may be interested in cultivating the value of their clinical and health data in ways that maintain data privacy. As shown in FIG. 3, in order to satisfy the desires of these two entities, a core process 300 for optimizing and/or validating the models on clinical and health data may be performed using an artificial intelligence algorithm development platform (e.g., the platform and systems described with respect to FIGS. 1 and 2).

At block 305, a third-party algorithm developer (a first entity) provides one or more algorithms or models to be optimized and/or validated in a new project. The one or more algorithms or models may be developed by the algorithm developer using their own development environment, tools, and seed data sets (e.g., training/testing data sets). In some instances, the models include one or more prediction models. The prediction models can comprise any algorithm, for example, a ML model including but not limited to a convolutional neural network ("CNN"), e.g. an inception neural network, a residual neural network ("Resnet"), or a recurrent neural network, e.g., long short-term memory ("LSTM") models or gated recurrent units ("GRUs") models. A prediction model can also be any other suitable ML model trained to predict something that cannot be directly measured or which will occur in the future, or to make an inference from data (a conclusion (e.g., a prediction of a model or a result of an algorithm). For example, in healthcare applications, these could be a clinical manifestation, identity, diagnosis, or prognosis from images or video frames, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). The algorithm developer may employ the same type of prediction model or different types of prediction models (e.g., an ensemble ML technique) for to make predictions or inferences, for example a clinical manifestation, identity, diagnosis, or prognosis. The seed data sets may be an initial data set (e.g., private or public clinical or health data) obtained by the algorithm developer for initial training and testing of the models.

At block 310, the algorithm developer provides constraints for the optimization and/or validation of the one or more models. The constraints may include one or more of the following: (i) training constraints, (ii) data preparation constraints, and (iii) validation constraints. These constraints fundamentally define objectives for the optimization and/or validation of the one or more models including data preparation (e.g., data curation, data transformation, data harmonization, and data annotation), model training, model validation, and reporting, as described in further detail with respect to FIGS. 4-12. As should be understood, in instances where the algorithm developer requests to optimize one or more of their models using training/testing data sets available from a data host (second entity), the algorithm developer may provide the models, training constraints and data preparation constraints. In other instances, where the algorithm developer requests to validate one or more of their models using validating data sets available from a data host, the algorithm developer may provide the models, validation constraints and data preparation constraints. In yet other instances, where the algorithm developer requests to optimize and validate one or more of their models using training/testing/validating data sets available from a data host, the algorithm developer may provide the models, the training constraints, the validation constraints, and data preparation constraints.

In some embodiments, the training constraints include but are not limited to one or more of following: hyperparameters, regularization criteria, convergence criteria, algorithm termination criteria, training/validation/test data splits defined for use in one or more algorithms, and training/testing report requirements. A model hyper parameter is a configuration that is external to the model and whose value cannot be estimated from data. The hyperparameters are settings that can be tuned or optimized to control the behavior of a machine learning algorithm and help estimate or learn model parameters. The process of selecting and optimizing hyperparameters is a key aspect of many machine learning solutions. Most machine learning algorithms explicitly define hyperparameters that control different aspects of the models such as memory or cost of execution. The hyperparameters may be specified by the algorithm developer and set using one or more problem solving techniques such as heuristics. However, additional hyperparameters may be defined to adapt an algorithm to a specific scenario. For example, the hyperparameters may include the number of hidden units of a model, the learning rate of a model, or the convolution kernel width for a model.

Regularization constrains or shrinks the coefficient estimates towards zero. In other words, this technique discourages learning a more complex or flexible model, so as to avoid the risk of overfitting. Regularization, significantly reduces the variance of the model, without a substantial increase in its bias. So constraints of regularization such as the tuning parameter $\lambda$, used in regularization techniques, controls the impact on bias and variance. As the value of $\lambda$, rises, it reduces the value of coefficients and thus reducing the variance. Till a point, this increase in $\lambda$, is beneficial as it is only reducing the variance (hence avoiding overfitting), without losing any important properties in the data. But after certain value, the model starts loosing important properties, giving rise to bias in the model and thus underfitting. Therefore, constraints of regularization such as the value of $\lambda$, may be selected to implement various regularization techniques within the models. In contrast, the convergence criterion is used to verify the convergence of a sequence (e.g., the convergence of one or more weights after a number of iterations). The convergence criterion may be implemented in various forms such as fixed number of epochs, goal definition, and early stop, and thus constraints for the convergence criterion may include the form or technique to be used and variables for the form or technique such as number of iterations of training to be performed, goal values, performance value, validation data set to be used, defined improvement, etc.

The algorithm termination criteria define parameters to determine whether a model has achieved sufficient training. Because algorithm training is an iterative optimization process, the training algorithm may perform the following steps multiple times: operate on all or part of the training data, update model parameters and then re-evaluate the performance of the model. In general, termination criteria may include algorithm performance objectives, often defined as a minimum amount of performance improvement per iteration or set of iterations, in order to continue processing. In some instances, termination criteria may include a maximum number of iterations of the training model update process or a maximum amount of clock time or computing cycles to be allocated to training. Other methods to determine when to stop the iterative training process are envisioned as well. The training/validation/test data splits include criteria for splitting data assets into training sets, validation, and/or test sets. The training data set is the set of data used to fit or train the model. The validation data set is the set of data used to provide an unbiased evaluation of a model fit or trained on the training dataset while tuning model parameters. The test data set is the set of data used to provide an unbiased evaluation of a final model fit or trained on the training data set. The splitting of these data sets may depend on a number of factors including a total number of samples that are available from the data to be used for training, testing, and/or validating the models. For example, some models need substantial data to train upon, so in this case the algorithm developer may define constraints that would optimize for larger training sets. Further, models with very few parameters may be simpler to validate and tune, so the algorithm developer may define constraints that reduce the size of the validation set. However, if a model has many parameters, then the algorithm developer may want to define constraints to accommodate a large validation set (although cross validation may also be considered and included within the constraints).

The training/testing report may include metrics and criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that can occur when finalizing a model such as vanishing or exploding gradients. Bias is an error in the learning algorithm, when the learning algorithm is weak to learn from the data. In an instance of high bias, the learning algorithm is unable to learn relevant details in the data. Thus, the model performs poor on the training data as well as on the test dataset. In contrast, variance is an error in the learning algorithm, when the learning algorithm tries to over-learn from the dataset or tries to fit the training data as closely as possible. In an instance of high variance, the algorithm performs poor on the test dataset, but may perform fairly well on the training dataset. Moreover, common error metrics such as mean percentage error and R2 score are not always indicative of accuracy of a model, and thus the algorithm developer may want to define additional metrics and criteria for a more in depth look at accuracy of the model. For example, if a chosen data set includes time series data which tends to be correlated in time and often exhibits a significant autocorrelation (when evaluating the model in terms of its ability of predicting the value directly, common error metrics such as mean percentage error and $R^2$ (coefficient of determination) score both indicate a false high prediction accuracy), then the algorithm developer may desire to monitor the autocorrelation using one or more additional metrics or criteria.

In some embodiments, the data preparation constraints include but are not limited to one or more of following: input data requirements and annotation protocol requirements. The input data requirements may include optimization and/or validation selection criteria for data assets to be run on the algorithm or model. The optimization and/or validation selection criteria define characteristics, data formats, and requirements for input data (e.g., external data) to be usable in the models. The characteristics and requirements for the input data refer to the characteristics and requirements of data such that the data is usable to optimize and/validate the model. For example, an algorithm implemented by the model may need training data that accurately represents the environment that the model will operate in such as different ethnic or geographical data etc., to create more a more generalizable algorithm. In some instances, the characteristics and requirements of the input data are defined based on: (i) the environment of the model, (ii) distribution of examples such as 50% male and 50% female, (iii) parameters and types of devices generating data (e.g., image data) and/or measurements, (iv) variance versus bias—models with high variance can easily fit into training data and welcome complexity but are sensitive to noise; whereas models with high bias are more rigid, less sensitive to variations in data and noise, and prone to missing complexities, (v) the task(s) implemented by the models such as classification, clustering, regression, ranking, and the like, or (vi) any combination thereof. For example, the characteristics and requirements of the data for models developed to predict the presence of a tumor using classification and clustering techniques may include a requirement for three-dimensional imaging data and/or biomarker testing data from an equal mix of females and males between the ages of 30 and 60 used in the identification of such a tumor. The formatting refers to not only the file format of the data (e.g., all image data should be in a .jpeg file format), but also the consistency of the records themselves. For example, the constraints for the data format may define a standard system of nomenclature (e.g., provide standardized codes, terms, synonyms and definitions which cover anatomy, diseases, findings, procedures, microorganisms, substances, etc.) for the data sets recognized by the models.

The annotation protocol requirements may include the different types of data annotation to be used for the models. Data annotation is the task of labeling the data (e.g., data sets for optimization and/or validation), which may be in any form such as structured numeric, text, audio, images, or video. Data annotation is an important stage of data preparation in supervised machine learning. The models learn to recognize recurring patterns in the annotated data. After an algorithm has processed enough annotated data, it may start to recognize the same patterns when presented with new, unannotated data. There are various types of annotation that may be defined within the annotation protocol based on the constraints. For example, semantic annotation may be defined for various concepts within text, such as analytical data, medical notes, or diagnostic codes. Moreover, text categorization and content categorization may be defined for assigning predefined categories to documents. For example, sentences or paragraphs can be tagged within a document by topic, or medical publications can be organized by subject such as internal medicine, oncology, hematology, microbiology, etc. For image and video annotation, bounding boxes may be used, which are imaginary boxes drawn on images or frames of video. The contents of the bounding box may be annotated to assist the models in recognizing the content as a distinct type of object such as a tumor or broken bone. For audio annotation, entity annotation, entity linking, and phrase chunking may be used for labeling and defining parts of unstructured speech, and tagging parts of speech with their linguistic or grammatical meaning.

In some embodiments, the validation constraints include but are not limited to one or more of following: validation data selection criteria, validation termination criteria, and a validation report requirements. The validation data selection criteria may include selection criteria for the validation data set that can include any factors required to select an appropriate subset of the data for the application being developed. For example, in healthcare applications, cohort selection includes, but is not limited to clinical cohort criteria, demographic criteria, and data set class balance. In healthcare algorithm development, cohort studies are a type of medical research used to investigate the causes of disease and to establish links between risk factors and health outcomes in groups of people, known as a cohort. Retrospective cohort studies look at data that already exists and try to identify risk factors for particular conditions. In a prospective cohort study, researchers raise a question and form a hypothesis about what might cause a disease. Then the researchers observe a cohort over a period of time, to prove or disprove the hypothesis. Thus, the clinical cohort criteria may define a group of people that the data is to be obtained from for the study, the type of study (e.g., retrospective or prospective), risk factors that the group may have exposure to over a period of time, question/hypothesis to be solved and associated disease or condition, and/or other parameters that define criteria for the cohort study. Demographic criteria define demographic factors for a group of people that the data is to be obtained from for the study. Demographic factors may include, for example, age, sex, education level, income level, marital status, occupation, religion, birth rate, death rate, average size of a family, average age at marriage. The data set class balance defines if and how the data is to be presented for the study. For example, in many instances a data set is imbalanced (e.g., many more patients with a negative analytical test result as compared to patients with a positive analytical test result). A simple way to fix imbalanced data-sets is to balance them, either by oversampling instances of the minority class or undersampling instances of the majority class. Thus, constraints for data set class balance may define (i) whether the data set should be balanced at all, (ii) how balanced should the data set be, e.g., is 40:60 acceptable compared to 80:20 or does it have to be 50:50, and (iii) how to perform the balance, e.g., oversample the minority class. Many of these cohort definition considerations in healthcare have analogues in other application areas.

The validation termination criteria define whether a model has achieved sufficient validation. The validation report may include metrics and criteria that the algorithm developer has an interest in observing from the validation of the one or more models. In some instances, the constraints for the metrics and criteria are selected to illustrate the overall performance and/or accuracy of the models. For example, the metrics and criteria may provide information on whether there are data errors within a new batch of data ingested by the models (e.g., mismatches between the expected and the actual state of the data), whether there are errors that manifest between batches of data, whether there is feature skew between training and testing, distribution skew between training and testing, whether there are mismatches between the expected data and assumptions made in the training code, the quality of the models, the accuracy of the models, the precision of the models, the performance of the models, and empirical data to assist with diagnosing model-quality problems. In certain embodiments, the metrics and criteria may provide information on hyperparameters that can be tuned to increase model performance.

Figure 4:
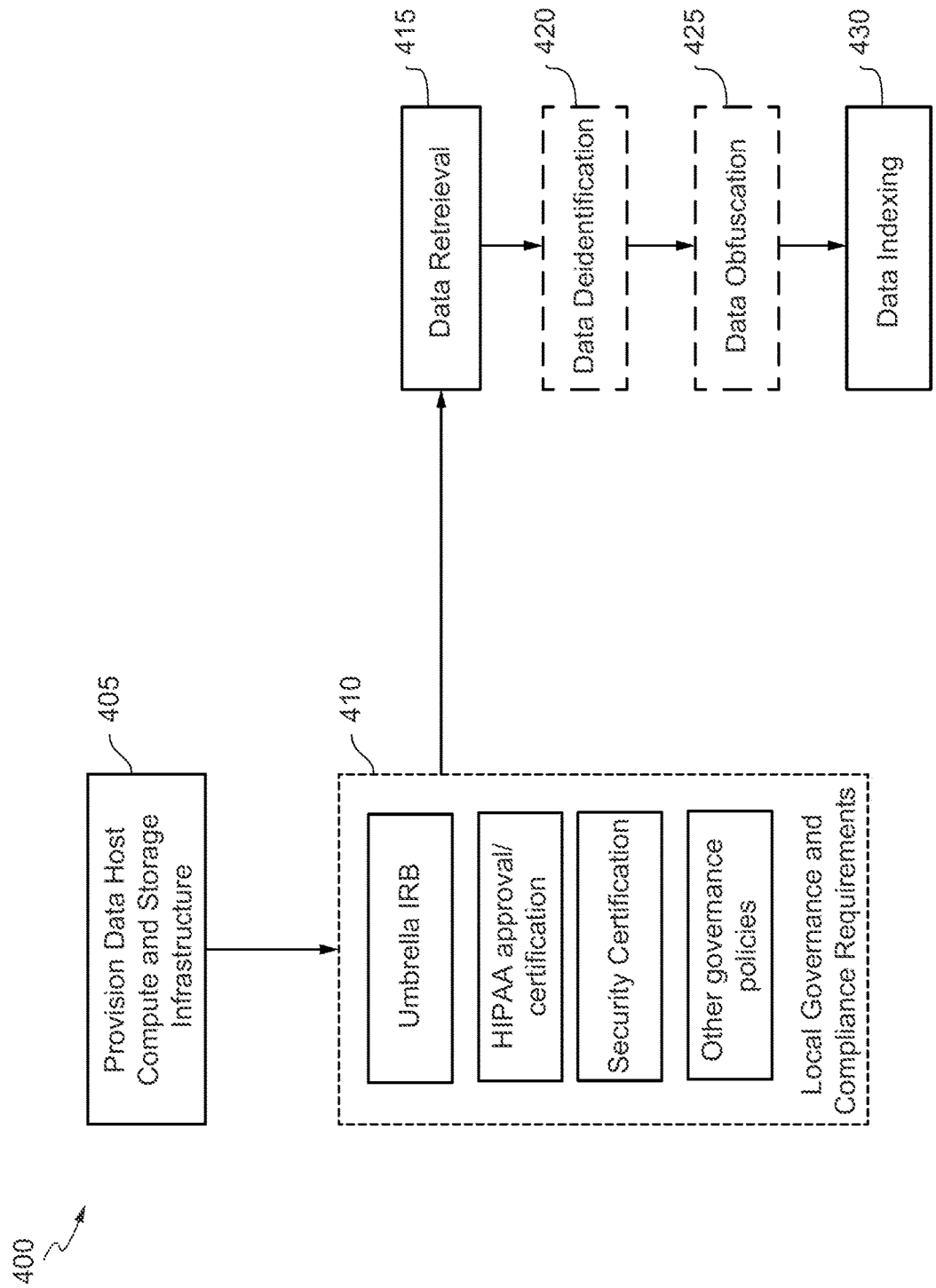
FIG. 4 shows a process for bringing one or more data hosts onboard the AI algorithm development platform in accordance with various embodiments.

At block 315, one or more data hosts are brought onboard the platform using a process as described in detail with respect to FIG. 4. In some instances, potential data hosts may be notified of possible opportunities to derive additional value from their data assets (e.g., clinical and health data) in ways that maintain data privacy. For data hosts interested in making available their data assets through the platform, the platform may bring the one or more data hosts onboard using a process that includes provisioning a data host compute and storage infrastructure within the infrastructure of the data host (e.g., the pre-existing infrastructure of a data host prior to instantiation the storage infrastructure), completing governance and compliance requirements with respect to exposure of data assets via the platform, and obtaining data assets that the data host is interested in making available to algorithm developers (the first entity) through the platform. Once onboard, the obtained data assets are searchable and assessable to the third parties in a manner that maintains data privacy.

Figure 5:
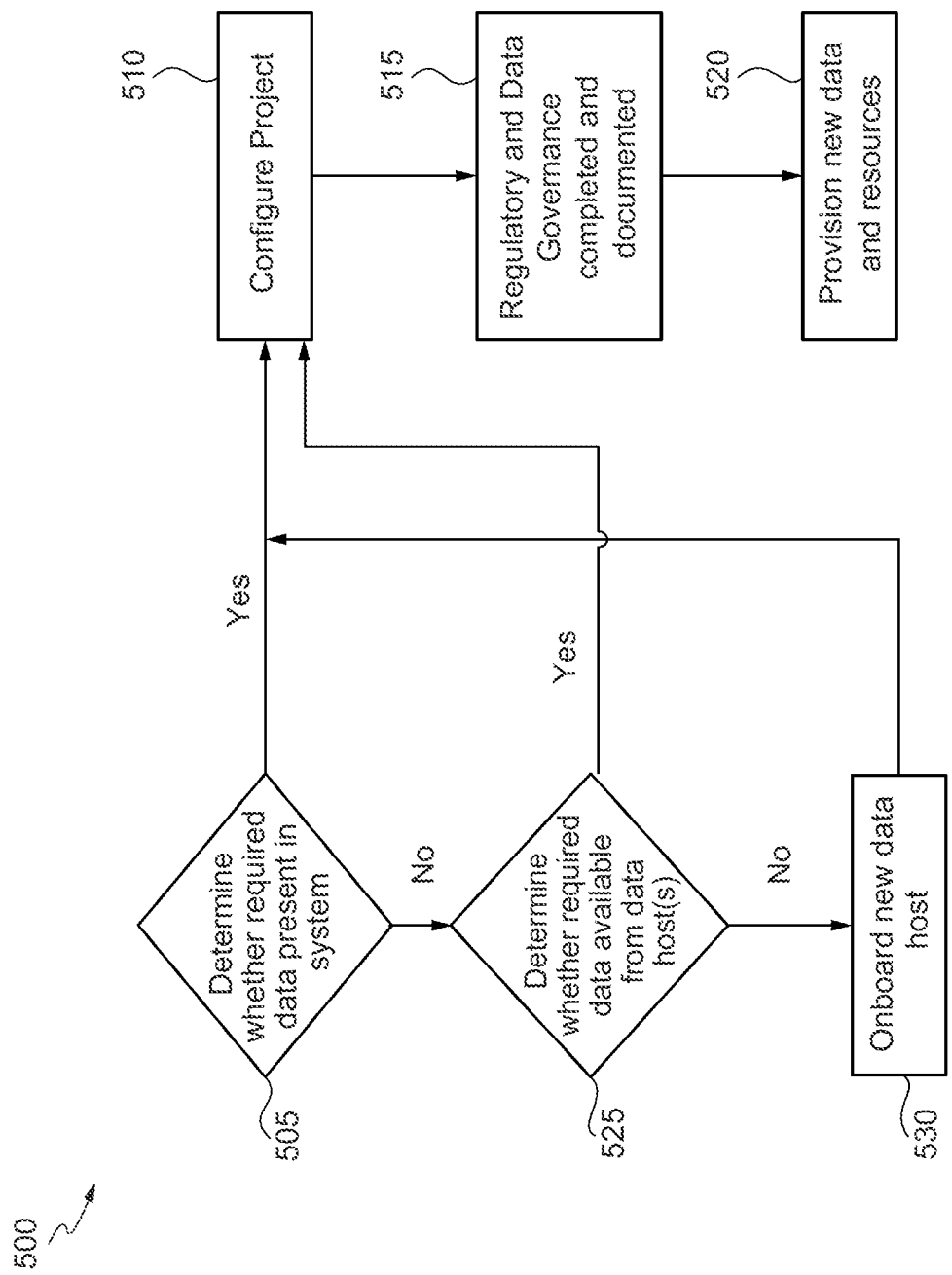
FIG. 5 shows a process for identifying, acquiring, and curating data assets to be used with the AI algorithm development platform in accordance with various embodiments.

At block 320, data assets to be used with the models are identified, acquired, and curated using a process as described in detail with respect to FIG. 5. In some instances, the data assets, as defined by the algorithm developer in block 310, are identified, acquired, and curated by the platform for transformation, annotation and computation. All data assets remain within the environment of the data host and can be organized physically in a or cloud-based data structure or the data assets can be organized logically within an existing data storage infrastructure. Storage space may be identified for storing metadata, intermediate computational steps, configurations and data, and model provenance and computational results. In some instances, the data sets, the metadata, and the provenance data may be preserved in persistent storage for future reference and for regulatory review.

At block 325, a determination is made as to whether the curated data assets are annotated in accordance with an annotation protocol (e.g., the annotation protocol defined in block 310). In some instances, the determination may be made by comparing the constraints of the annotation protocol to the annotation presently applied to the curated data assets. When the curated data assets are annotated in accordance with an annotation protocol, then annotation is not required and the process continues at block 340. When the curated data assets are not annotated in accordance with an annotation protocol, then annotation is required and the process continues at block 330. At block 330, the curated data assets are prepared for annotation as described in detail with respect to FIG. 6. In some instances, the annotation protocol requires the data assets to be transformed into a specific format or modified in a specific manner for annotation. For example, a video, which is comprised of multiple images may need to be separated into individual frames or images for viewing and annotation. The transformation process will usually be an intermediate step toward the ultimate goal of harmonization, in which data is put into the form required by one or more algorithms of the model(s).

Figure 7:
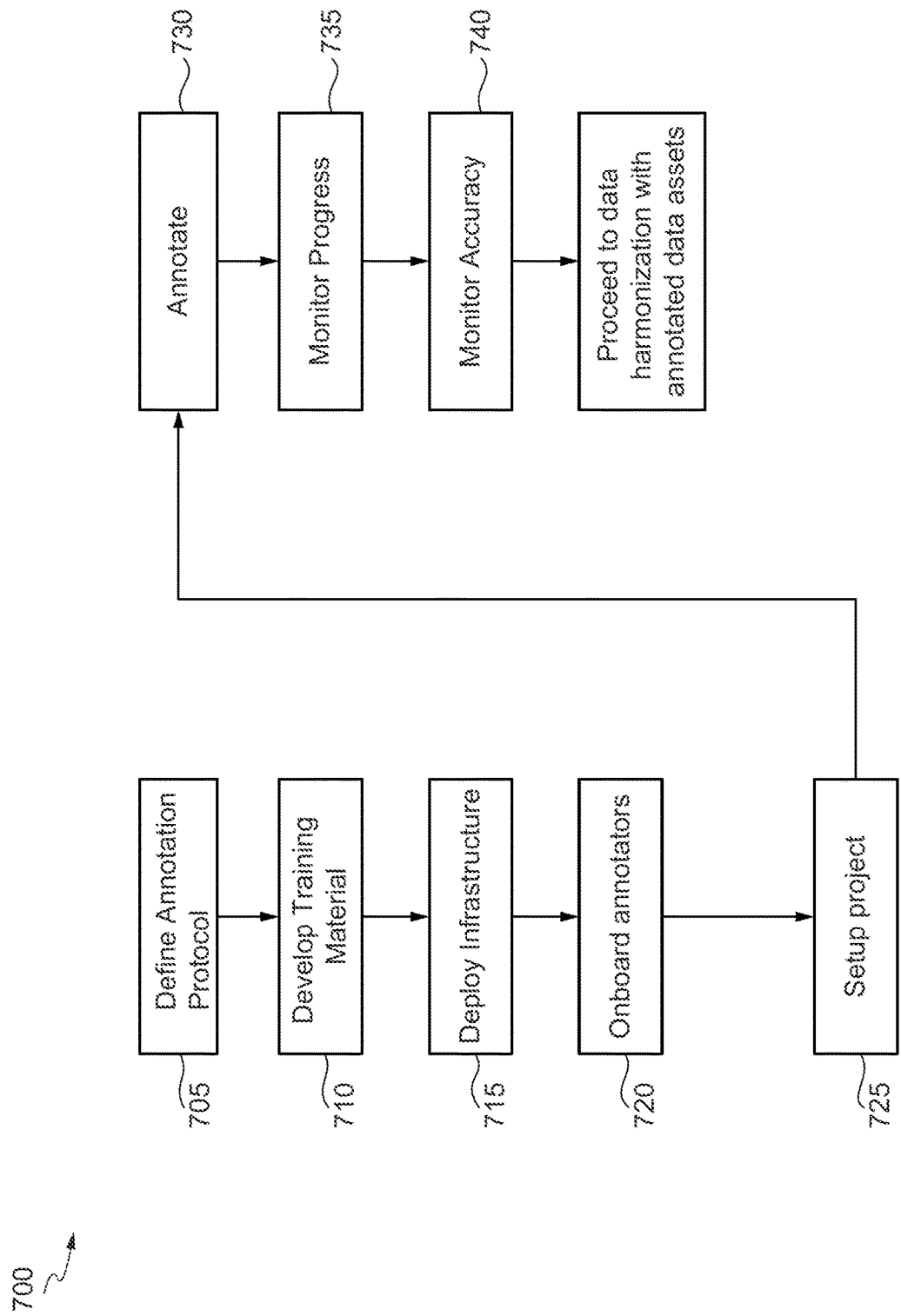
FIG. 7 shows a process for annotating data assets to be used with the AI algorithm development platform in accordance with various embodiments.

At block 335, once the data assets are prepare for annotation, the data assets are annotated as described in detail with respect to FIG. 7. Each algorithm of the models may require data to be labeled in a specific way. For example, a breast cancer detection/screening system may require specific lesions to be ized and identified. Another example, would be gastro-intestinal cancer digital pathology, in which each image may need to be segmented and labeled by the type of tissue present (normal, necrotic, malignant, etc.). In some instances involving text or clinical data, annotation may include applying a labeling ontology to selected subsets of text and structured data. The annotation is performed by to the data host in the secure capsule computing service. A key principle to the transformation and annotation processes is that the platform facilitates a variety of processes to apply and refine data cleaning and transformation algorithms, while preserving the privacy of the data assets, all without requiring data to be moved outside of the technical purview of the data host.

At block 340, a determination is made as to whether the annotated data assets are harmonized in accordance with an algorithm protocol (e.g., the training and/or validation constraints defined in block 310). Data harmonization is the process of bringing together data sets of varying file formats, naming conventions, and columns, and transforming it into one cohesive data set. In some instances, the determination may be made by comparing the training and/or validation constraints to the harmonization of the annotated data assets. When the annotated data assets are harmonized in accordance with an algorithm protocol, then further harmonization is not required and the process continues at block 360. When the annotated data assets are not harmonized in accordance with an algorithm protocol, then harmonization is required and the process continues at block 345. At block 345, the annotated data assets are harmonization as described in detail with respect to FIG. 8. In some instances, the algorithm protocol requires the data assets to be transformed into a specific format or modified in a specific manner for computation. Harmonization of the data may be performed to transform the data assets to the specific format or modified in a specific manner.

At blocks 350 and 355, the models are prepared for computing upon the data assets. The processes performed in blocks 350 and 355 may be performed subsequent to preparation of the data assets (e.g., transformation and annotation), prior to preparation of the data assets, or in parallel with the preparation of the data assets. At optional block 350, the models may be refactored. This process may be performed to support special libraries or optimizations to allow the models to operate within the platform. For example, in order to operate on homomorphically encrypted data in an efficient way, special libraries may need to be included in the model code. These libraries may be incorporated into the model during the refactor process. However, it should be understood that the refactor process is not required for all optimization and/or validation algorithms.

At block 355, the models are integrated into a secure capsule computing services framework to facilitate the deployment of software, including algorithms to be validated and/or trained, to external environments (in this case, the computing environment of the data host) and additionally provide security services to protect both the privacy of the software deployed within the capsule, and the security of the host computing environment. The secure capsule computing services framework includes a model serving system provisioned within the platform. The model serving system associates each model with one or more secure deployment capsules, deploys the models within the one or more secure deployment capsules to a data host, and the models may be served or utilized from within the one or more secure capsules for optimization and/or validation via one or more secure application program interfaces (APIs). For example, once a model is deployed to a data host as a part of a secure capsule computing service, the platform may deploy or output data resources, model parameters, or shared data for training (e.g., parent-teacher training paradigm) to the model via the algorithm APIs. In return, the platform may receive via the algorithm APIs input including computing results, data, and computing monitoring results, trained models, model parameters, or other results of deployed computing components and processes such as secure capsule computing services. The secure deployment capsules allow for a model to be run from within the infrastructure of the data host in an isolated manner while maintaining the privacy of the data assets and the model (e.g., the algorithms). Furthermore, the data host that is running the model in the one or more secure deployment capsules may not be able to inspect, copy or modify the algorithm developer's proprietary software. Moreover, the data host that is running the model in the one or more secure deployment capsules may be protected against the possibility that the model being hosted is malicious and could harm the organization's infrastructure or compromise data privacy.

In various embodiments, the secure capsule computing framework is provisioned within a computing infrastructure (e.g., one or more server, one or more computing nodes, one or more virtual computing devices, or the like) configured to accept encrypted code required to run the algorithm. The encryption may be industry-standard public key/private key encryption (e.g., AES 256). This computing infrastructure can be running in the data host's computing infrastructure or it can be running on the data host's cloud infrastructure. The encrypted code is signed by the platform and stored in an archive (e.g., a data storage device). The platform cannot see the contents of the encrypted code, but this establishes a record of the exact algorithm that was validated by the platform in the event that it is ever requested by a regulatory body such as the Food & Drug Association (FDA). The secure capsule computing framework is instantiated on the computing infrastructure and the encrypted code is deposited by the algorithm developer inside the secure capsule computing framework. At this point, the encrypted code is decrypted. In some instances, the encrypted code may be decrypted by the algorithm developer by passing the correct private key to the secure capsule computing framework. The secure capsule computing framework may be created by encrypting the contents of memory with private keys that are stored in the CPU hardware of the server so that it is not possible to interact with the contents of the secure capsule computing framework once it has been launched, except via a defined API described herein. Even the operating system itself cannot interact with the contents of the secure capsule computing framework because they are encrypted with a key that is only accessible to the CPU hardware. This means that even if the operating system has been compromised, the contents of the secure capsule computing framework cannot be monitored or read.

At block 360, the optimization and/or validation of the models is performed using the data assets. In some instances, the optimization comprises initializing the algorithms with predefined values or random values for weights and biases and attempting to predict an output with those values. In certain instances, the models are pre-trained by the algorithm developer, and thus the algorithms may already be initialized with weights and biases. In other instances, predefined values or random values for weights and biases may be defined by the algorithm developer in block 310 and populated into the algorithms at block 360. Thereafter, data assets and hyperparameters may be input into the algorithms, inferences or predictions may be computed, and testing or comparisons may be made to determine how accurately the trained models predicted the output. The optimization may include running one or more instances of training and/or testing with the data assets in an attempt to optimize performance of the models (e.g., optimize the weights and biases) as described in detail with respect to FIG. 9. The validation may include running one or more instances of validation with the data assets in an attempt to validate the models based on gold standard labels as described in detail with respect to FIG. 10. At block 365, one or more reports are generated and delivered to the algorithm developer based on the results of block 360. In some instances, the reports are generated in accordance with the training/testing report requirements and/or validation report requirements defined in block 310.

FIG. 4 shows a process 400 for bringing one or more data hosts onboard the artificial intelligence algorithm development platform (e.g., the platform and systems described with respect to FIGS. 1 and 2). At block 405, a data host compute and storage infrastructure (e.g., a secure capsule computing service as described with respect to FIGS. 1 and 2) is provisioned within the infrastructure of the data host. In some instances, the provisioning includes deployment of encapsulated algorithms in the infrastructure, deployment of a physical computing device with appropriately provisioned hardware and software in the infrastructure, deployment of storage (physical data stores or cloud-based storage), deployment on public or private cloud infrastructure accessible via the infrastructure, etc.

At block 410, governance and compliance requirements are completed. In some instances, the completion of the governance and compliance requirements includes clearance from an institutional review board (IRB). The IRB may be set up as part of the platform or may be a separate entity affiliated with the data host. The IRB may be used for review and approval for use of data assets from the data host for purposes of algorithm development, validation and training, including federated training. In certain instances, specific projects to be run on the platform will be reviewed as amendments to the IRB in order to streamline the review and approval process. Completion of the governance and compliance requirements may further include review and approval of compliance of any project being performed by the platform and/or the platform itself under governing law such as the Health Insurance Portability and Accountability Act (HIPAA). In some instances, the platform including deployment of encapsulated algorithms in existing infrastructure, deployment of a physical appliance with appropriately provisioned hardware and software, deployment on public or private cloud infrastructure, etc., and some or all activities within the platform and ancillary to the platform for executing a project, should be compliant with governing law (e.g., 100% HIPAA compliant). This process step is intended to capture activities by the data host that are required to review and approve the governing law compliance of the platform. In some instances, assertion of a predefined certification, such as HyTrust Certification, may be sufficient for this process.

Completion of the governance and compliance requirements may further include obtaining security certification. For example, it is typical for data hosts to apply a security review process to all newly provisioned hardware and software systems. Details of the security review may be defined by at the data host and determined on a case by case basis for obtaining the security certification; however the platform should be provisioned to conform to security best practices that can be clearly documented and demonstrated. The completion of the governance and compliance requirements may further include review and approval of compliance any project being performed by the platform and/or the platform itself under additional governance/compliance activities. For example, each data host or government region that a data host is located may have additional governance/compliance activities. The platform including deployment of encapsulated algorithms in existing infrastructure, deployment of a physical appliance with appropriately provisioned hardware and software, deployment on public or private cloud infrastructure, etc., and some or all activities within the platform and ancillary to the platform for executing a project, should be compliant with the additional governance/compliance activities. This process step is intended to capture activities by the data host that are required to review and approve additional governance/compliance activities of the platform. In some instances, assertion of a predefined certification may be sufficient for this process.

At block 415, the data assets that the data host desires to be made available for optimization and/or validation of models are retrieved. In some instances, the data assets may be transferred from existing storage locations and formats to provisioned storage (physical data stores or cloud-based storage) for use by the platform (curated into one or more data stores accessible by the platform). For example, a first data set of the data assets may be identified as being available on a first database of a data host (a second entity) and a second data set of the data sets may be identified as being available on a second database of the data host. In this instance, the retrieval of the data assets may include physically izing the first data set and the second data set in provisioned storage in a manner that maintains data privacy. The provisioned storage may be newly provisioned in step 505 or may be existing storage in which new access permissions for the platform are defined. In other instances, the data assets may not be physically moved to provisioned storage, but a collection of logical addresses may be recorded in the provisioned storage or a pre-existing storage (physical data stores or cloud-based storage that are part of the data host's pre-existing infrastructure) accessible to the platform. As the data assets are retrieved (physically or logically) and stored, a data provenance may be documented for use by the platform in project management and data quality assurance. As should be understood, the data assets are not moved out of the data host's infrastructure (which may be newly provisioned storage or pre-existing storage).

Block 415 may be performed repeatedly over time in order to update the platform with new data as the data host collects new data or avails the platform of new data assets. These updates may be continuous or batched, but all changes to the retrieved data assets, including provenance information, may be recorded to ensure that the data used in each phase of each project can be exactly replicated and its provenance understood.

Optionally at block 420, the data assets may be de-identified. In some instances, the data assets may need to be de-identified prior to use in the platform. De-identification is a process used to prevent someone's personal identity from being revealed. For example, data produced during human subject research might be de-identified to preserve privacy for research participants. Strategies for de-identification may include deleting or masking personal identifiers, such as personal name, and suppressing or generalizing quasi-identifiers, such as date of birth. In certain instances, the data assets may be de-identified and appropriate re-identification information may be recorded in a protected form (e.g. encrypted).

Optionally at block 425, the data assets may be obfuscated. In some instances, the data assets may need to be obfuscated prior to use in the platform. Data obfuscation is a process that includes data encryption or tokenization. Data encryption is a security process where sensitive data is encoded using an algorithm and encryption key, and can only be accessed or decrypted by a user with the algorithm and correct encryption key. In some embodiments, the data is encrypted either using traditional encryption algorithms (e.g., RSA) or homomorphic encryption. The choice to encrypt by a specific algorithm may be determined by a combination of regulatory requirements and business needs. For example, a data host may provide broad access to homomorphically encrypted data for purposes of algorithm validation, but provide highly restricted access to RSA-encrypted data for algorithm training. Data tokenization is a security method where sensitive data is turned into a random string of characters called a token that has no meaningful value if breached and can only be accessed or decrypted by a user with access to a token vault, which stores the relationship between the sensitive value and the token. In some embodiments, the data is tokenized and the token vault is maintained by the data host.

At block 430, the data assets may be indexed. Data indexing allows queries to efficiently retrieve data from a database. The indexes may be related to specific tables and may be comprised of one or more keys or values to be looked up in the index (e.g., the keys may be based on a data table's columns or rows). By comparing query terms to the keys within the index it is possible to find one or more database records with the same value in an efficient manner. In some instances, basic information such as metadata and statistical attributes of data fields are computed as one or more keys and stored in the index. The details of what basic information is collected and how it is exposed for searching within the platform depends on the data type and anticipated use cases. In general, this basic information is intended to aid in queries by identifying what data might be available on the platform for projects and the attributes of the data. The basic information can also be used to inform the platform or end user of data transformation and harmonization methods that may be needed to work with the data assets. Further, the basic information can be used for anomaly detection and general data quality assurance purposes.

FIG. 5 shows a process 500 for identifying, acquiring, and curating data assets to be used with the platform (e.g., the platform and systems described with respect to FIGS. 1 and 2) to complete a new project (e.g., optimization and/or validation of model(s) received in block 305 of FIG. 3). At block 505, a determination is made as to whether the data assets to be used with the models are already available on the platform (already onboard). The determination may be made by identifying the presence (or lack thereof) of the data assets on the platform. The data assets may be identified by running queries on the data assets retrieved from onboard data hosts (e.g., a partner academic medical center), as described with respect to FIG. 4. In some instances, the input data requirements (e.g., input data characteristics, data formats, and requirements for external data to be usable in the models that is obtained in block 310 of FIG. 3) may be used by the platform as search terms, filters, and/or additional information to identify data assets available to the platform and usable by the models for achieving stated objectives.

The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform, in response, the platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets. When the data assets are available on the platform (e.g., a search identifies data assets that satisfy the query or constraints of the input data requirements), then the process proceeds to block 510 to configure a new project for the data assets. When the data assets are not available on the platform (e.g., a search does not identify data assets that satisfy the query or constraints of the input data requirements), then the process proceeds to block 525 to determine whether data assets are available from an existing data host.

At block 510, a new project is configured for the data assets. In some instances, the data host computer and storage infrastructure is provisioned or configured within the infrastructure of the data host to handle a new project with the identified data assets. In some instances, the provisioning or configuration is performed in a similar manner to the process described in block 405 of FIG. 4. For example, the provisioning or configuration may include deployment of encapsulated algorithms specific to the new project in the infrastructure, deployment of storage (physical data stores or cloud-based storage) specific to the new project, deployment on public or private cloud infrastructure accessible via the infrastructure, etc.

At block 515, regulatory approvals (e.g., IRB and other data governance processes) are completed and documented. In some instances, the regulatory approvals may already exist and simply need to be updated for the new project or may need to be completed in full for the new project. In some instances, the regulatory approvals are completed in a similar manner to the process described in block 410 of FIG. 4. For example, the completion of the governance and compliance requirements may include setting up an IRB or amending a current IRB, review and approval of compliance of the new project and/or platform under governing law, obtaining security certification, and review and approval of compliance of the new project and/or platform under additional governance/compliance activities.

At block 520, data storage is provisioned and data formatting is configured for new data assets identified on the platform or new data assets being brought onboard. In some instances, the data storage provisioning includes identification and provisioning of a new logical data storage location, along with creation of an appropriate data storage and query structure. For example, in some embodiments, data may be stored in a relational database, in a no-SQL data store, in flat files (e.g. JSON), or other structure. Within these access models, data may be organized as a relational data schema (e.g. star schema) or as a set of data frames, among many other possibilities. The determination of the storage model may be influenced by the data type, the algorithm type and underlying algorithm software, or may be determined by system requirements set out by the platform itself. When data collection and aggregation into the platform is ongoing (as in the case of a prospective study) then additional documentation may be stored to identify exactly what data set has been used in each step of the training or validation process so that ongoing performance metrics can be properly compared. Additional provisioning factors may need to be considered here, including the total allowed size of the data set (as it grows), and how ongoing quality assessment will be carried out to avoid introduction of flawed data into training sets. Additionally, since this is a new project for existing data hosts, the data host compute and storage infrastructure may need to be provisioned or re-configured and regulatory approvals (e.g., IRB and other data governance processes) may need to be completed and documented to account for the intended use of new data assets, as described with respect to blocks 510 and 515.

At block 525, a determination is made as to whether the data assets to be used with the models are available from a known or existing data host (not previously brought onboard). The determination may be made by the platform sending out a data asset request with the input data requirements (e.g., input data characteristics, data formats, and requirements for external data to be usable in the models that is obtained in block 310 of FIG. 3) to known or existing data hosts. Data hosts are notified of the opportunity and data assets may be identified by the data hosts based on the input data requirements. When the data assets are available from a known or existing data host (e.g., one or more data hosts respond to the request), then the process proceeds to block 510 to configure the new project and bring the data assets onboard (the known or existing data host may have had other sets of data previously brought onboard, but in this instance new data assets are being brought onboard). When the data assets are not available from a known or existing data host (e.g., one or more data hosts do not respond to the request), then the process proceeds to block 530 to look for a new host (e.g., potential data hosts may be notified of the new project as an opportunity to derive additional value from their data assets in ways that maintain data privacy as described with respect to block 315 of FIG. 3).

At block 530, one or more new data hosts are brought onboard the platform. In an instance in which one or more new data hosts respond to the notification of the new project, the one or more new data hosts and their data assets may be brought onboard the platform, as described with respect to FIG. 4. When the data assets are available from a one or more new data hosts (e.g., one or more data hosts are brought onboard), then the process proceeds to block 510 to configure the new project and bring the new data assets onboard.

Figure 6:
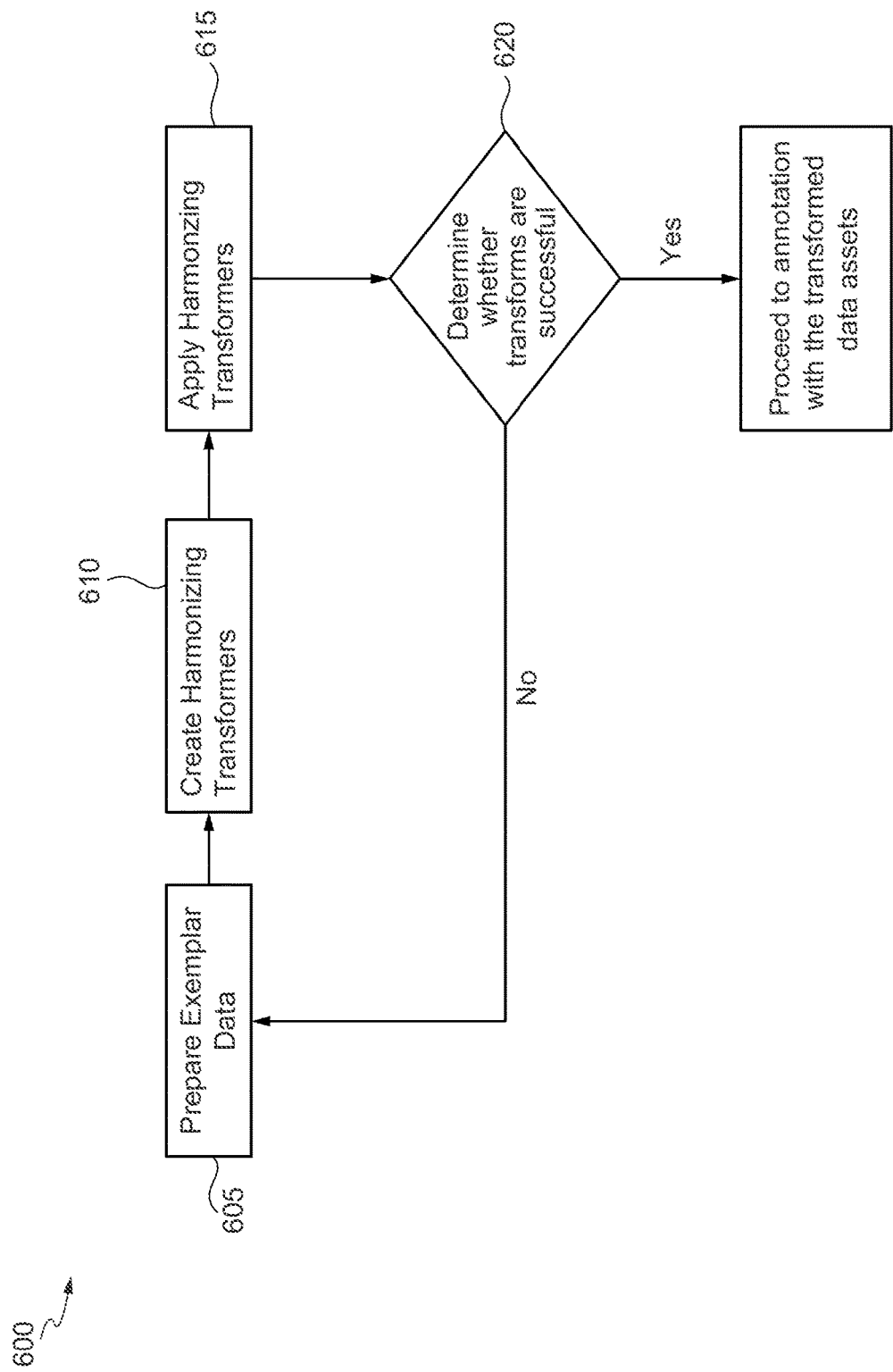
FIG. 6 shows a process for transforming data assets to be used with the AI algorithm development platform in accordance with various embodiments.

FIG. 6 shows a process 600 for transforming data assets to be used with the platform (e.g., the platform and systems described with respect to FIGS. 1 and 2) to complete a new project (e.g., optimization and/or validation of model(s) received in block 305 of FIG. 3). The goal of process 600 is to prepare the data assets for annotation, which may require the data to be presented in a specific format or to be modified for annotation. At block 605, exemplar data may be prepared. In some instances, the preparation of the exemplar data includes the identification or creation of a data set that captures key attributes of the harmonization process. In certain instances, the preparation includes de-identification of the exemplar data. For example, the data host may identify or create a small, representative set of exemplar data (transformer prototype set) to use as a guide for developing algorithms for data transformation models for data transformation. The data of the transformer prototype set may be de-identified and made available to the algorithm developer for creation of remote harmonizing transformers to implement the harmonization processes.

At block 610, harmonizing transformers are created for transformation of the data assets based on the present format of data in the transformer prototype set. The harmonizing transformers may be created in accordance with (i) training constraints, (ii) data preparation constraints, and (iii) validation constraints defined in block 310 of FIG. 3. The harmonizing transformers will be used to ultimately convert raw data assets of the data host into a format usable for annotation. At block 615, the harmonizing transformers developed for the transformer prototype set are applied to the raw data assets of the data host made available for the project. The harmonizing transformers are run on data assets by the platform or data host within the infrastructure of the data host in order to maintain privacy of the data assets. At block 620, the platform or data host reviews the resulting transformed data sets (pre-annotation) to determine whether the transforms are applied successfully and applied without violating data privacy requirements. In some instances, the determination includes identifying gaps in the initial transformer prototype set and/or errors in transformer execution. When failures exist in the transformation process, then the process returns to block 605 to identify new data members for the transformer prototype set. When the data assets are transformed successfully, then the process proceeds to the annotation process for annotating the transformed data assets.

FIG. 7 shows a process 700 for annotating data assets to be used with the platform (e.g., the platform and systems described with respect to FIGS. 1 and 2) to complete a new project (e.g., optimization and/or validation of model(s) received in block 305 of FIG. 3). At block 705, the algorithm developer defines an annotation protocol to create gold standard labels for training, testing, and validation of models. The annotation protocol may be defined as described with respect to block 310 of FIG. 3. At block 710, the algorithm developer creates training materials for annotators. Training materials may include, but are not limited to, video of annotation performed on example data, annotated example data from algorithm developer sources, annotated examples of deidentified data from data host sources, written flow charts, automated scripts and tools available from annotation software. At block 715, an annotation infrastructure may be deployed. Deployment of the infrastructure may include setting up an annotation interface and back end data storage environment for annotated data. In some instances, the annotation infrastructure is deployed within the data host's infrastructure to maintain privacy of the data assets. This process may include procuring licensing for sufficient annotator logins, tracking of annotator performance, annotations and other metadata about project status and provenance of data.

At block 720, annotator(s) are brought onboard the platform. For example, annotators may be identified, engaged and trained. Login credentials may be provided to annotators along with any computing or access requirements (computers, cloud computing access, display workstations, etc.). Conditions of work, contracting, including compensation, HIPAA compliance, etc. may be implemented to ensure the privacy of the data assets is maintain through-out annotation. At block 725, an annotation project is setup or configured. In some instances, the data host may define project objectives and an annotator worklist strategy in collaboration with algorithm developer. The project objective and annotator worklist strategy can then be used to guide setup or configure the annotation project. For example, project objectives may be defined that are measurable and contain key performance indicators (e.g., # of data points to be annotated per day or per session), which may be used to assess the annotation project's success. Further, the annotation worklist strategy may be defined to account for one or more operational considerations including division of data among annotators, including test data (supplied by algorithm developer with known labels), exposure of data to multiple annotators (e.g., for inter-operator variability and annotator accuracy monitoring), multiple exposure of data to a same annotator (e.g., to monitor intra-operator variability), and other operational considerations.

At block 730, annotation of data (e.g., the transformed data from process 600) is performed according to defined annotation protocol, and following project structure as defined in block 725. At block 735, the performance of the annotation process and compliance with data privacy requirements is monitored. The algorithm developer, the data host, or a combination thereof may monitor the performance of the annotators. In this context, performance can include both rate of work and also accuracy of work (which may be monitored separately in block 740), and can be broken down by annotator and data type. For example, number of annotations per day and total annotations by each annotator may be monitored to determine if annotators are meeting contractual obligations and are on track for project objectives. Accuracy of annotation can be monitored by a number of means. For example, test data may be supplied by the algorithm developer, and which has known labels, can be presented to annotators to ensure that they are substantially following the protocol. In some embodiments, the same data can be presented to multiple annotators to assess/estimate annotator accuracy. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. It is envisioned that automated annotation technology may be incorporated at block 730 as well. In some instances, pre-existing automated annotation technology can be used for some annotation tasks. In other cases, as data is annotated, models will be developed to automate, accelerate and/or augment the annotation process. Such tools can then be used in future annotation tasks, which may be associated with different data sets and different algorithm developer projects.

Figure 8:
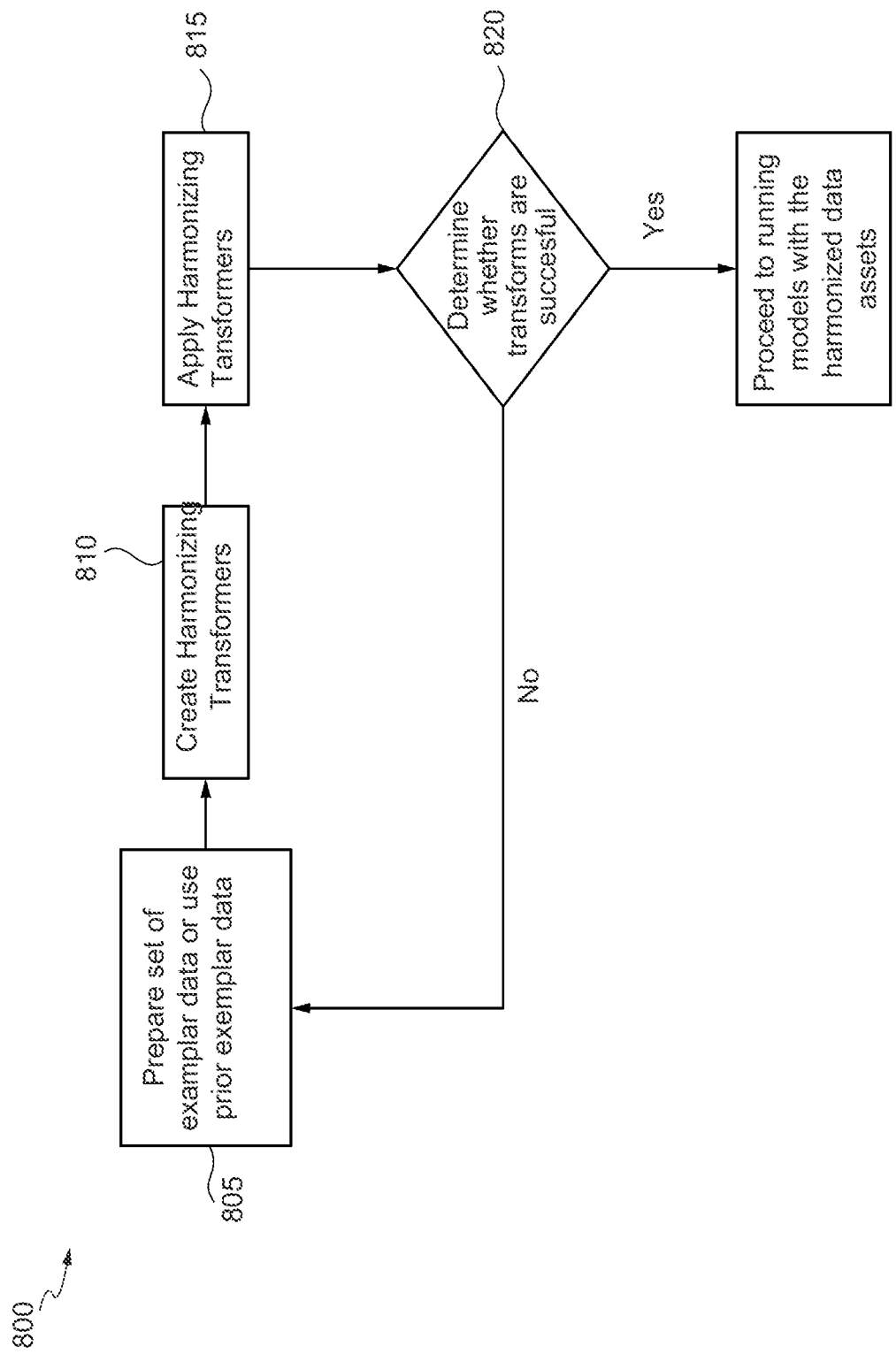
FIG. 8 shows a process for harmonizing data assets to be used with the AI algorithm development platform in accordance with various embodiments.

FIG. 8 shows a process 800 for harmonizing data assets to be used with the platform (e.g., the platform and systems described with respect to FIGS. 1 and 2) to complete a new project (e.g., optimization and/or validation of model(s) received in block 305 of FIG. 3). The goal of process 800 is to prepare the data assets for computation by one or more algorithms, which may require the data to be presented in a specific format or to be modified for processing. At block 805, exemplar data may be prepared. In some instances, the preparation of the exemplar data includes the identification or creation of a data set that captures key attributes of the harmonization process. In certain instances, the preparation includes de-identification of the exemplar data. For example, the data host may identify or create a small, representative set of exemplar data (harmonization prototype set) to use as models for data transformation. The data of the harmonization prototype set may be de-identified and made available to the algorithm developer for creation of remote harmonizing transformers to implement the harmonization processes. The exemplar data may be the same set of exemplar data used in the transformation process described with respect to FIG. 6 (transformer prototype set), may be a supplemented data set (e.g., new data members added to the transformer prototype set to create the harmonization prototype set), or may be a completely new data set for harmonization.

At block 810, harmonizing transformers are created for harmonization of the data assets based on the present format of data in the harmonization prototype set. The harmonizing transformers may be created in accordance with (i) training constraints, (ii) data preparation constraints, and (iii) validation constraints defined in block 310 of FIG. 3. The harmonizing transformers will be used to ultimately convert the transformed/annotated data assets of the data host into a format usable for input into the models. At block 815, the harmonizing transformers developed for the harmonization prototype set are applied to the transformed/annotated data assets of the data host made available for the project. The data transformers are run on transformed/annotated data assets by the platform or data host within the infrastructure of the data host in order to maintain privacy of the data assets. At block 820, the platform or data host reviews the resulting harmonized data sets (prior to model running) to determine whether the transforms are applied successfully and applied without violating data privacy requirements. In some instances, the determination includes identifying gaps in the initial transformer prototype set and/or errors in transformer execution. When failures exist in the transformation process, then the process returns to block 805 to identify new data members for the harmonization prototype set. When the data assets are transformed successfully, then the process proceeds to the optimization and/or validation process for using the harmonized data assets in the models. Advantageously, these steps to facilitate the multi-step harmonization and annotation of data for use in an algorithm are capable of being implemented without exposing the underlying data to the algorithm developer.

Figure 9:
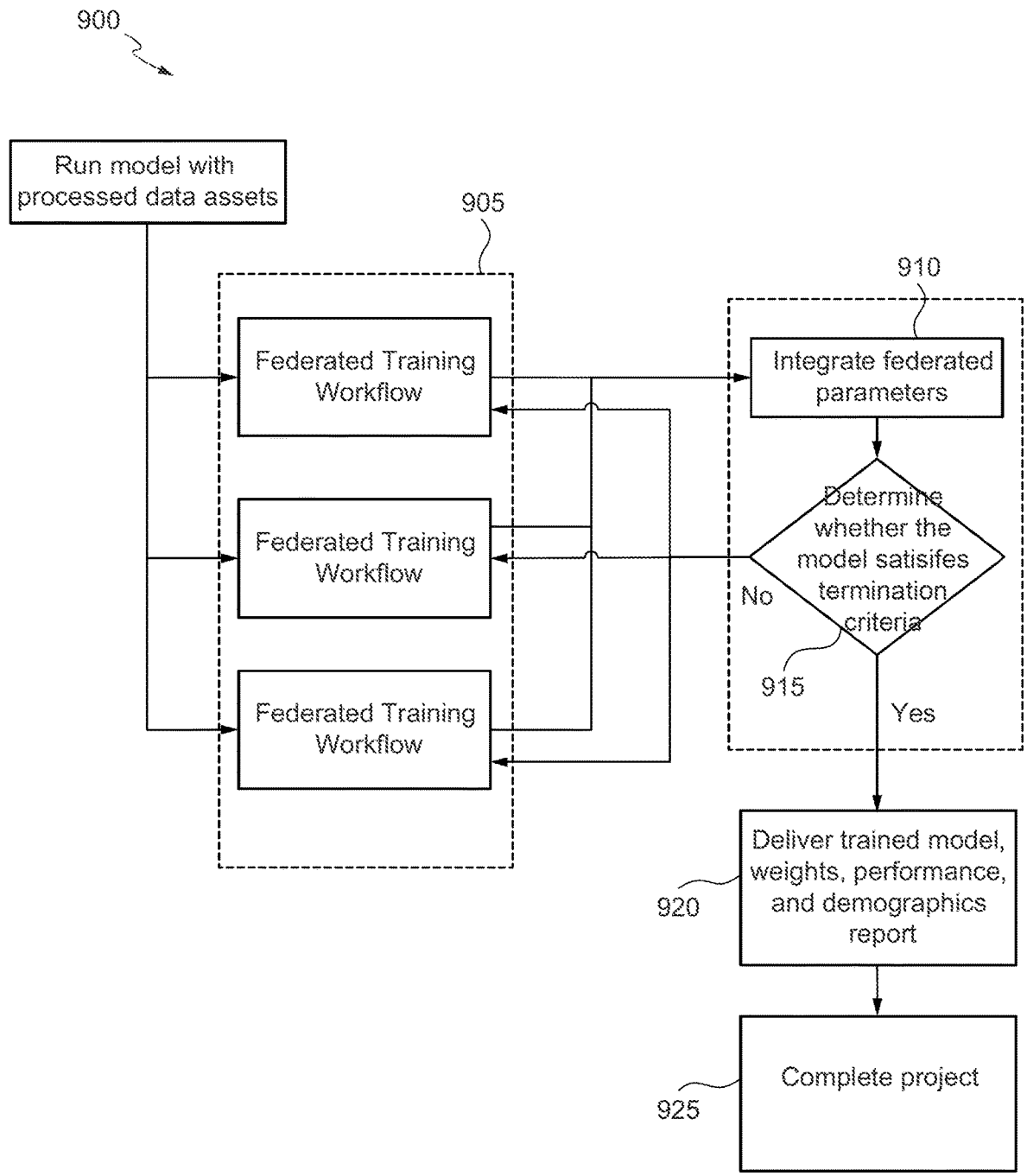
FIG. 9 shows a process for optimizing one or more models using the AI algorithm development platform in accordance with various embodiments.

FIG. 9 shows a process 900 for optimizing one or more models using the platform (e.g., the platform and systems described with respect to FIGS. 1 and 2). At block 905, federated training workflows are executed for training data sets (training data sets split from data assets) on each instance of the algorithm. In some instances, algorithm training is performed on training data sets to generate trained models. The training data sets may be hosted by one or more data hosts as discussed with respect to FIGS. 3 and 4. The federated training workflow takes as input the training data assets, maps features of the training data assets to a target inference using parameters, computes a loss or error function, updates the parameters to learned parameters in order to minimize the loss or error function, and outputs one or more trained instances of the model. For example, the federated training workflow may take as input the training data assets, finds patterns in the training data assets that map attributes of the training data assets to a target prediction using model parameters, calculates training gradients of a loss or error function, updates the model parameters to learned model parameters in response to the training gradients, and outputs a trained instance of the algorithm that captures the patterns in the training data assets using the learned model parameters.

Data from the training set is passed to the secure capsule computing framework by the data host via the API and the responses of the one or more models (e.g., training gradients) are passed back to platform, where the responses are aggregated into a training report. Other than this interaction, communication from inside the secure capsule computing framework to outside the secure capsule computing framework is not allowed preventing a rogue algorithm from communicating private data outside the secure capsule computing framework. In some embodiments, the federated training workflow includes a full model training in which algorithm training is fully converged and all hyperparameters are optimized. In other embodiments, the federated training workflow carries out an incremental training. In either instance, the results of the training such as the parameters and/or training gradients are transmitted to a master algorithm module for integration into a "fully federated model." The results such as the parameters and/or training gradients may be encrypted prior to transmission to ensure data asset and model privacy.

At block 910, results including the parameters and/or training gradients for each trained instance of the model are integrated into a fully federated model. The integrating comprises aggregating the results such as the parameters and/or training gradients to obtain aggregated parameters and/or training gradients and updating the learned model parameters of the fully federate model with the aggregated parameters and/or training gradients. In some instances, the aggregating is performed using horizontal federated learning, vertical federated learning, federated transfer learning, or any combination thereof.

At block 915 a testing workflow is executed on the fully federated model. The testing workflow takes as input testing data, finds patterns in the testing data using the updated learned model parameters, and outputs an inference. Additionally, performance of the fully federated model in providing the inference is computed and a determination is made as to whether the fully federated model has satisfied the algorithm termination criteria (i.e., criteria that defines whether a model has achieved sufficient training). In some instances, hyperparameters and model parameters of the model are tested for convergence, error state, failure to converge, etc., according to the algorithm termination criteria defined by algorithm developer in block 310 of FIG. 3. When the termination criteria has not been reached, then the process proceeds back to block 905 where an updated model (e.g., the fully federated model) is distributed to each data host for additional training on training data sets. This iterative process repeats until the algorithm termination criteria has been satisfied. A progress status of the algorithm training process may be reported to the algorithm developer during this step in accordance with reporting constraints. When the algorithm termination criteria has been satisfied, then the process proceeds to block 920.

At block 920, once the iterative algorithm training process has satisfied the algorithm termination criteria, then the aggregate results such as the aggregated parameters and/or training gradients of the fully federated model, along with a report of performance metrics in accordance with reporting constraints may be delivered to the algorithm developer. At block 925, the optimizing process may be determined to be completed by the algorithm developer. In some instances, upon the iterative algorithm training process satisfying the algorithm termination criteria or upon request of the algorithm developer, the aggregate results such as the aggregated parameters and/or training gradients may be transmitted to each instance of the model. An update training workflow may be executed on each instance of the model. The update training workflow updates the learned model parameters with the aggregated parameters and/or training gradients, and outputs an updated instance of the model that captures the patterns in the training and testing data assets using the updated learned model parameters.

In certain instances, the model and the data sets used with the training processes are maintained for future purposes (e.g., regulatory review). For example, once the training activity has been completed, the entire secure capsule computing framework and all of its contents may be securely deleted so that there is no ongoing risk of exposure to the transferred data or the model. The original encrypted code that was submitted for training is archived by the platform to ensure that it will always be available for inspection by regulators.

Figure 10:
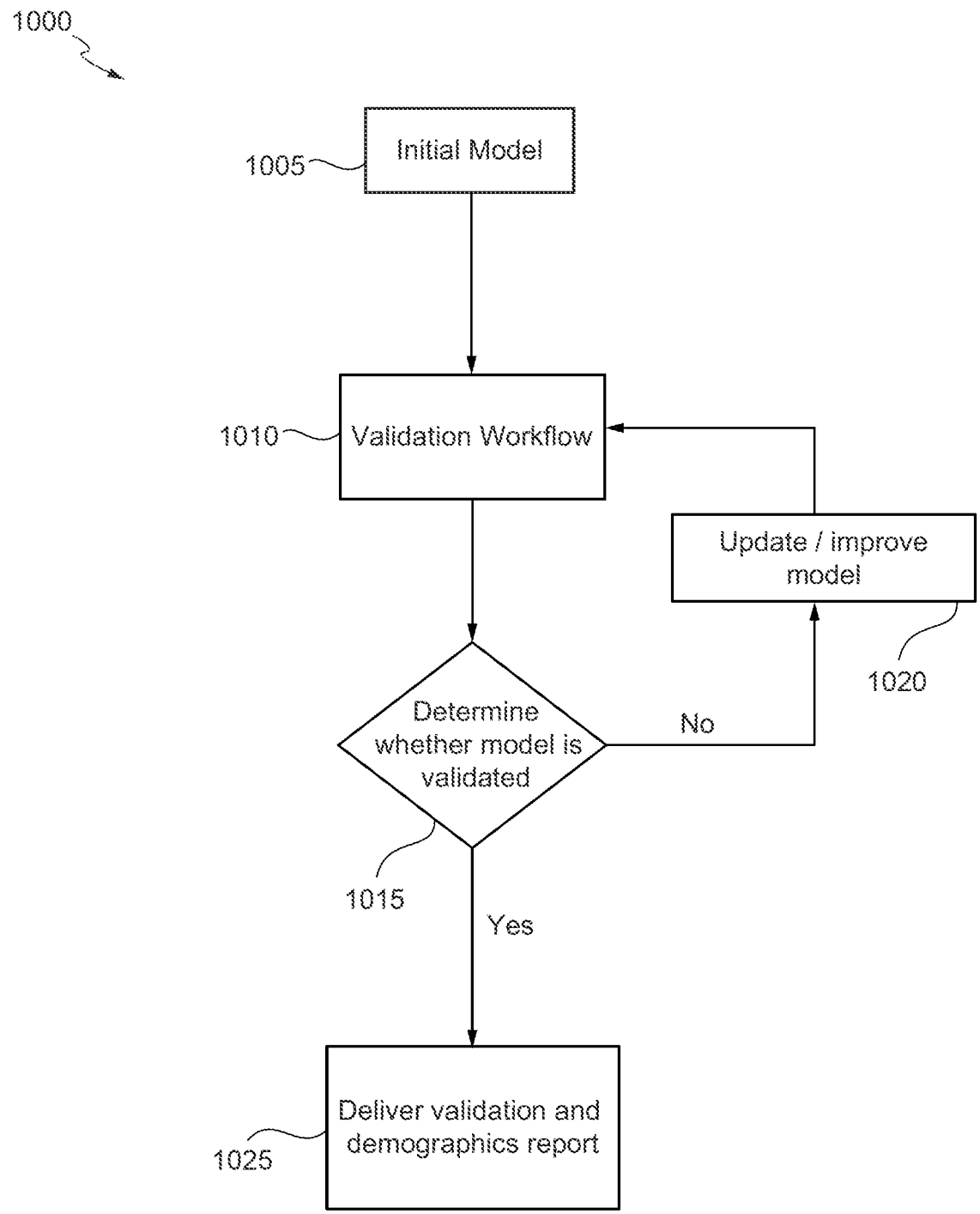
FIG. 10 shows a process for validating one or more models using the AI algorithm development platform in accordance with various embodiments.

FIG. 10 shows a process 1000 for validating one or more models using the platform (e.g., the platform and systems described with respect to FIGS. 1 and 2). At block 1005, an initial model is obtained. In some instances, the model obtained is a pre-existing trained model obtained from an algorithm developer. The initial model may be obtained as discussed with respect to FIG. 3. At block 1010, a validation workflow is executed for validation data sets (validation data sets split from data assets). In some instances, validation is performed on validation data sets to determine model performance or accuracy. The validation data sets may be hosted by one or more data hosts as discussed with respect to FIGS. 3 and 4. The validation workflow takes as input the validation data sets, finds patterns in the validation data sets using learned model parameters, and outputs an inference. Data from the validation set is passed to the secure capsule computing framework by the data host via the API and the responses of the one or more models (e.g., an inference) are passed back to platform, where the responses are aggregated into a validation report. Other than this interaction, communication from inside the secure capsule computing framework to outside the secure capsule computing framework is not allowed preventing a rogue algorithm from communicating private data outside the secure capsule computing framework.

At block 1015, performance or accuracy of the model is computed based on gold standard labels (i.e., ground truths) and determination is made as to whether the model has been validated. For example, an algorithm designed to detect breast cancer lesions in mammograms can be validated on a set of mammograms that have been labeled by medical experts as either containing or not containing a lesion. The performance of the algorithm relative to this expertly labeled set of mammograms is the validation report. In some instances, feature selection, classification, and parameterization of the model are visualized (e.g., using area under curve analysis) and ranked, according to validation criteria defined (i.e., criteria upon which validation of the model is determined) by algorithm developer in block 310 of FIG. 3. In some instances, determining whether the model has been validated includes determining whether the model has satisfied validation termination criteria (i.e., criteria that defines whether a model has achieved sufficient validation) defined by algorithm developer in block 310 of FIG. 3.

When performance of the model has not been validated, then the process proceeds back to block 1020 where the model may be fine-tuned (e.g., optimize hyperparameters). The optimization of hyperparameters may be performed using any know optimization technique such as grid search and random search techniques. This iterative process repeats until the model has been validated or until validation termination criteria has been satisfied. A progress status of validation process may be reported to the algorithm developer during this step in accordance with reporting constraints. When the validation termination criteria has been satisfied, then the process proceeds to block 1025. At block 1025, once the validation termination criteria has been satisfied, then the optimized hyperparameters of the validated model, along with a report of performance metrics in accordance with reporting constraints may be delivered to the algorithm developer. In some instances, the report of performance metrics may be provided as a single validation report for validation of the algorithm or model on a single set of data assets. In other instances, the report of performance metrics may be provided as a single validation report for validation of the algorithm or model aggregated from validations on any number of disjoint sets of data assets. Thereafter, the validation process may be determined to be completed by the algorithm developer. In certain instances, the model and the data sets used with the validation processes are maintained for future purposes (e.g., regulatory review). For example, once the validation activity has been completed, the entire secure capsule computing framework and all of its contents may be securely deleted so that there is no ongoing risk of exposure to the transferred data or the model. The original encrypted code that was submitted for validation is archived by the platform to ensure that it will always be available for inspection by regulators.

Figure 11:
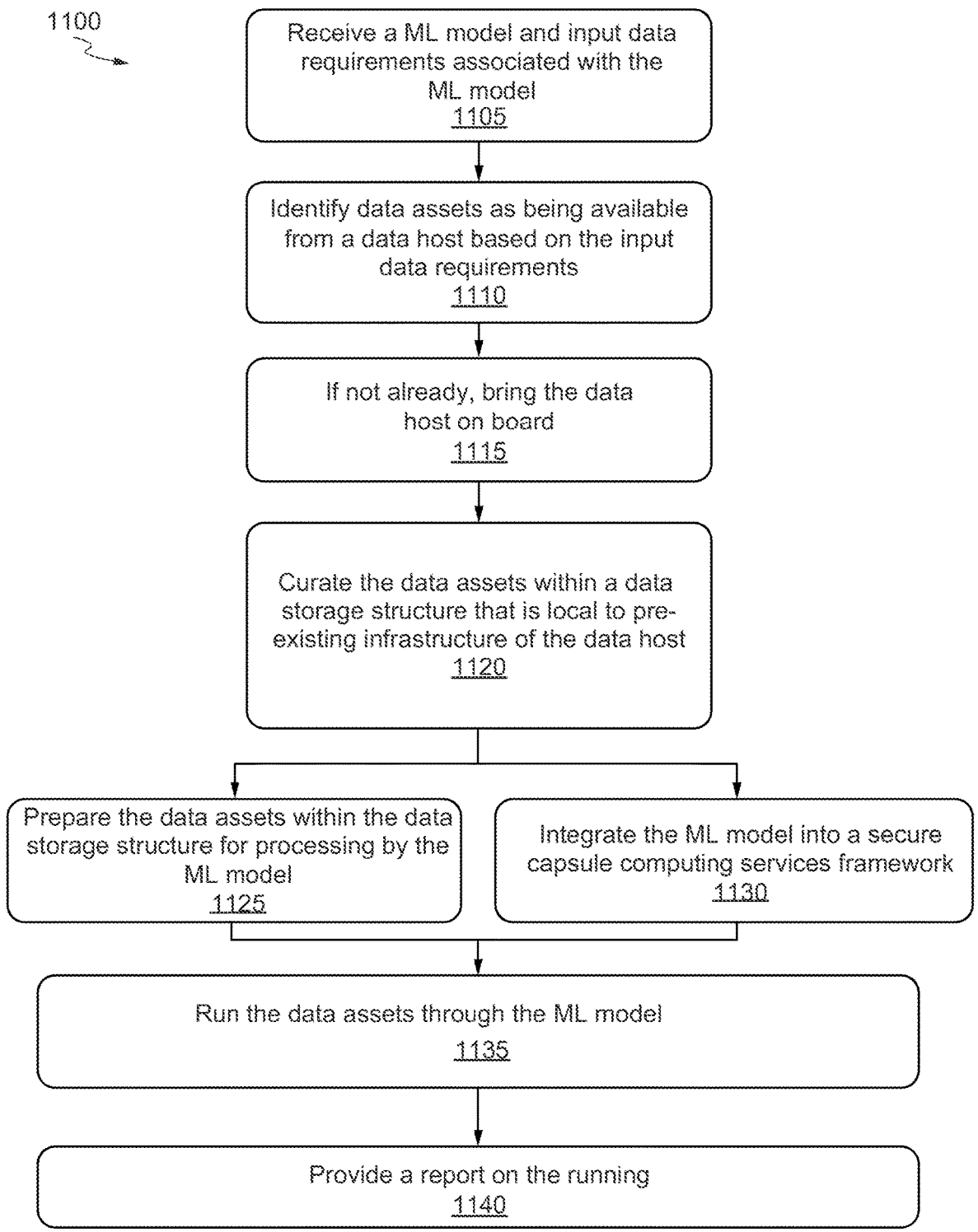
FIG. 11 shows an exemplary flow for optimizing and/or validating the models on clinical and health data in accordance with various embodiments.

FIG. 11 is a simplified flow chart 1100 illustrating an example of processing for optimizing and/or validating a model using a model development platform and system (e.g., the model development platform and system described with respect to FIGS. 1-10). Process 1100 begins at block 1105, at which a model and input data requirements associated with the model are received from an algorithm developer (e.g., first entity). The input data requirements may include optimization and/or validation selection criteria for data assets to be run on the model. The optimization and/or validation selection criteria define characteristics, formats and requirements for data assets to be run on the model. At block 1110, data assets are identified as being available from a data host based on the input data requirements (e.g., the optimization and/or validation selection criteria) for the data assets. The data assets may be identified by running one or more queries on data storage structures of one or more hosts based on the optimization and/or validation selection criteria.

At block 1115, the data host is brought onboard (if not previously brought onboard). The onboarding comprises confirming that the use of the data assets with the model is in compliance with data privacy requirements. At block 1120, the data assets are curated within a data storage structure that is within infrastructure of the data host. The curating may comprises selecting the data storage structure from multiple data storage structures and provisioning the data storage structure within the infrastructure of the data host. The selection of the data storage structure may be based on a type of algorithm within the model, a type of data within the data assets, system requirements of the computing device, or a combination thereof. At block 1125, the data assets are prepared within the data storage structure for processing by the model. The preparing the data assets may comprise applying one or more transforms to the data assets, annotating the data assets, harmonizing the data assets, or a combination thereof.

At block 1130, the model is integrated into a secure capsule computing framework. The secure capsule computing framework may serve the model to the data assets within the data storage structure via an application program interface in a secure manner that preserves privacy of the data assets. At block 1135, the data assets are run through the model. In some embodiments, the running the data assets through the model comprises executing a training workflow that includes: creating multiple instances of the model, splitting the data assets into sets of training data and one or more sets of testing data, training the multiple instances of the model on the sets of training data, integrating results from the training each of the multiple instances of the model into a fully federated model, running the one or more sets of testing data through the fully federated model and computing performance of the fully federated model based on the running of the one or more sets of testing data. In other embodiments, the running the data assets through the model comprises executing a validation workflow that includes: splitting the data assets in one or more sets of validation data, running the one or more sets of validation data through the model, and computing performance of the model based on the running of the one or more sets of validation data. At block 1140, a report may be provided to the algorithm developer concerning the running of the model in block 1145.

Figure 12:
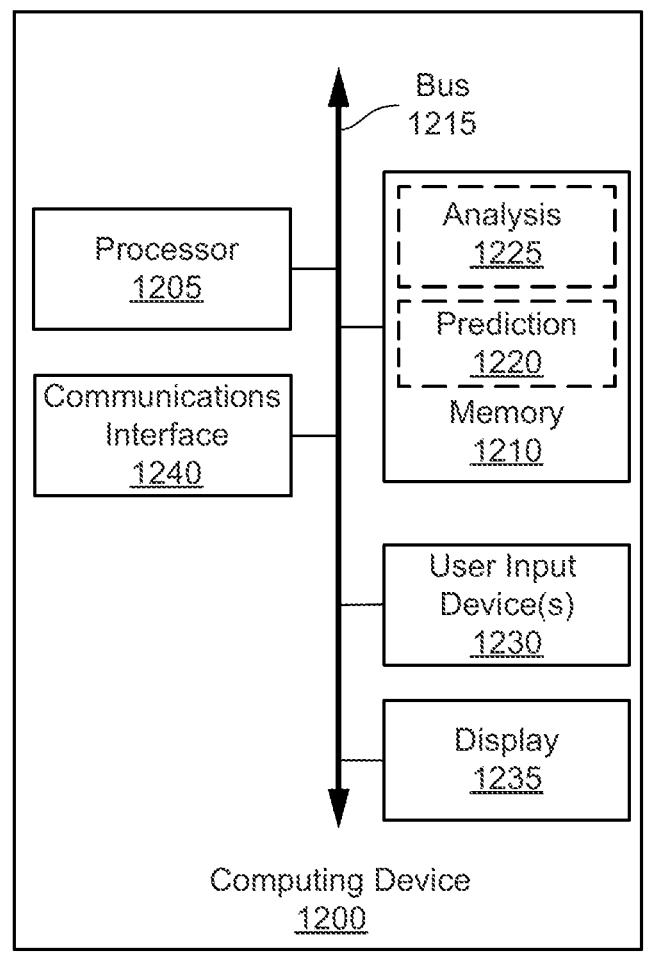
FIG. 12 shows an exemplary computing device as part of a data processing system in accordance with various embodiments.

FIG. 12 illustrates an example computing device 1200 suitable for use with systems and methods for developing artificial intelligence algorithms by distributing analytics to multiple sources of privacy protected, harmonized clinical and health data according to this disclosure. The example computing device 1200 includes a processor 1205 which is in communication with the memory 1210 and other components of the computing device 1200 using one or more communications buses 1215. The processor 1205 is configured to execute processor-executable instructions stored in the memory 1210 to perform one or more methods for developing artificial intelligence algorithms according to different examples, such as part or all of the example method 1100 described above with respect to FIG. 11. In this example, the memory 1210 stores processor-executable instructions that provide inferences 1220 using models and data assets and model performance analysis 1225, as discussed above with respect to FIGS. 1-11. The computing device 1200, in this example, also includes one or more user input devices 1230, such as a keyboard, mouse, touchscreen, microphone, etc., to accept user input. The computing device 1200 also includes a display 1235 to provide visual output to a user such as a user interface.

The computing device 1000 also includes a communications interface 1240. In some examples, the communications interface 1240 may enable communications using one or more networks, including a area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an algorithm-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

IV. Additional Considerations

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more algorithm specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    identifying a plurality of instances of an algorithm, wherein each instance of the algorithm is integrated into one or more secure capsule computing frameworks, wherein the one or more secure capsule computing frameworks serve each instance of the algorithm to training data assets within one or more data storage structures of one or more data hosts in a secure manner that preserves privacy of the training data assets and each instance of the algorithm;

executing, by a data processing system, a federated training workflow on each instance of the algorithm, wherein the federated training workflow takes as input the training data assets, maps features of the training data assets to a target inference using parameters, computes a loss or error function, updates the parameters to learned parameters in order to minimize the loss or error function, and outputs one or more trained instances of the algorithm;

integrating, by the data processing system, the learned parameters for each trained instance of the algorithm into a fully federated algorithm, wherein the integrating comprises aggregating the learned parameters to obtain aggregated parameters and updating learned parameters of the fully federated algorithm with the aggregated parameters;

executing, by the data processing system, a testing workflow on the fully federated algorithm, wherein the testing workflow takes as input testing data, finds patterns in the testing data using the updated learned parameters, and outputs an inference;

calculating, by the data processing system, performance of the fully federated algorithm in providing the inference;

determining, by the data processing system, whether the performance of the fully federated algorithm satisfies an algorithm termination criteria;

when the performance of the fully federated algorithm does not satisfy the algorithm termination criteria, replacing, by the data processing system, each instance of the algorithm with the fully federated algorithm and re-executing the federated training workflow on each instance of the fully federated algorithm; and when the performance of the fully federated algorithm does satisfy the algorithm termination criteria, providing, by the data processing system, the performance of the fully federated algorithm and the aggregated parameters to an algorithm developer of the algorithm.

2. The method of claim 1, wherein the identifying the plurality of instances of the algorithm, comprises:

receiving, at the data processing system, the algorithm and input data requirements associated with the algorithm, wherein the input data requirements include optimization and/or validation selection criteria for data assets to be run on the algorithm;

identifying, by the data processing system, the data assets as being available from the one or more data hosts based on the optimization and/or validation selection criteria for the data assets;

curating, by the data processing system, the data assets within a data storage structure that is within infrastructure of each data host of the one or more data hosts; and splitting at least a portion of the data assets into the training data assets within the data storage structure that is within the infrastructure of each data host of the one or more data hosts.

3. The method of claim 2, wherein the algorithm and input data requirements are received from the algorithm developer, which is a different entity from the one or more data hosts, and the optimization and/or validation selection criteria define characteristics, formats and requirements for data assets to be run on the algorithm.

4. The method of claim 1, wherein the federated training workflow further comprises encrypting the training gradients, and the integrating comprises decrypting the training gradients.

5. The method of claim 1, further comprising:

when the performance of the fully federated algorithm does satisfy the algorithm termination criteria, transmitting, by the data processing system, aggregated parameters to each instance of the algorithm; and executing, by the data processing system, an update training workflow on each instance of the algorithm, wherein the update training workflow updates the learned parameters with the aggregated parameters, and outputs one or more updated and trained instances of the algorithm.

6. The method of claim 5, further comprising running, by the data processing system, a remainder of the data assets through each instance of the algorithm.

7. The method of claim 5, wherein the running the data assets through each instance of the algorithm comprises executing a validation workflow that includes: further splitting at least a portion of the data assets into one or more sets of validation data, running the one or more sets of validation data through each instance of the algorithm, and computing performance of each instance of the algorithm based on the running of the one or more sets of validation data.

8. A system comprising:

one or more data processors; and a non-transitory computer readable storage medium containing instructions which, when executed on the one or more data processors, cause the one or more data processors to perform actions comprising:

identifying a plurality of instances of an algorithm, wherein each instance of the algorithm is integrated into one or more secure capsule computing frameworks, wherein the one or more secure capsule computing frameworks serve each instance of the algorithm to training data assets within one or more data storage structures of one or more data hosts in a secure manner that preserves privacy of the training data assets and each instance of the algorithm;

executing a federated training workflow on each instance of the algorithm, wherein the federated training workflow takes as input the training data assets, maps features of the training data assets to a target inference using parameters, computes a loss or error function, updates the parameters to learned parameters in order to minimize the loss or error function, and outputs one or more trained instances of the algorithm;

integrating, by the data processing system, the learned parameters for each trained instance of the algorithm into a fully federated algorithm, wherein the integrating comprises aggregating the learned parameters to obtain aggregated parameters and updating learned parameters of the fully federated algorithm with the aggregated parameters;

executing, by the data processing system, a testing workflow on the fully federated algorithm, wherein the testing workflow takes as input testing data, finds patterns in the testing data using the updated learned parameters, and outputs an inference;

calculating, by the data processing system, performance of the fully federated algorithm in providing the inference;

determining, by the data processing system, whether the performance of the fully federated algorithm satisfies an algorithm termination criteria;

when the performance of the fully federated algorithm does not satisfy the algorithm termination criteria, replacing, by the data processing system, each instance of the algorithm with the fully federated algorithm and re-executing the federated training workflow on each instance of the fully federated algorithm; and when the performance of the fully federated algorithm does satisfy the algorithm termination criteria, providing, by the data processing system, the performance of the fully federated algorithm and the aggregated parameters to an algorithm developer of the algorithm.

9. The system of claim 8, wherein the identifying the plurality of instances of the algorithm, comprises:

receiving, at the data processing system, the algorithm and input data requirements associated with the algorithm, wherein the input data requirements include optimization and/or validation selection criteria for data assets to be run on the algorithm;

identifying, by the data processing system, the data assets as being available from the one or more data hosts based on the optimization and/or validation selection criteria for the data assets;

curating, by the data processing system, the data assets within a data storage structure that is within infrastructure of each data host of the one or more data hosts; and splitting at least a portion of the data assets into the training data assets within the data storage structure that is within the infrastructure of each data host of the one or more data hosts.

10. The system of claim 9, wherein the algorithm and input data requirements are received from the algorithm developer, which is a different entity from the one or more data hosts, and the optimization and/or validation selection criteria define characteristics, formats and requirements for data assets to be run on the algorithm.

11. The system of claim 8, wherein the federated training workflow further comprises encrypting the training gradients, and the integrating comprises decrypting the training gradients.

12. The system of claim 8, wherein the actions further comprise:

when the performance of the fully federated algorithm does satisfy the algorithm termination criteria, transmitting, by the data processing system, aggregated parameters to each instance of the algorithm; and executing, by the data processing system, an update training workflow on each instance of the algorithm, wherein the update training workflow updates the learned parameters with the aggregated parameters, and outputs one or more updated and trained instances of the algorithm.

13. The system of claim 12, wherein the actions further comprise running, by the data processing system, a remainder of the data assets through each instance of the algorithm.

14. The system of claim 12, wherein the running the data assets through each instance of the algorithm comprises executing a validation workflow that includes: further splitting at least a portion of the data assets into one or more sets of validation data, running the one or more sets of validation data through each instance of the algorithm, and computing performance of each instance of the algorithm based on the running of the one or more sets of validation data.

15. A computer-program product tangibly embodied in a non-transitory machine-readable storage medium, including instructions configured to cause one or more data processors to perform actions comprising:

identifying a plurality of instances of an algorithm, wherein each instance of the algorithm is integrated into one or more secure capsule computing frameworks, wherein the one or more secure capsule computing frameworks serve each instance of the algorithm to training data assets within one or more data storage structures of one or more data hosts in a secure manner that preserves privacy of the training data assets and each instance of the algorithm;

executing a federated training workflow on each instance of the algorithm, wherein the federated training workflow takes as input the training data assets, maps features of the training data assets to a target inference using parameters, computes a loss or error function, updates the parameters to learned parameters in order to minimize the loss or error function, and outputs one or more trained instances of the algorithm;

integrating, by the data processing system, the learned parameters for each trained instance of the algorithm into a fully federated algorithm, wherein the integrating comprises aggregating the learned parameters to obtain aggregated parameters and updating learned parameters of the fully federated algorithm with the aggregated parameters;

executing, by the data processing system, a testing workflow on the fully federated algorithm, wherein the testing workflow takes as input testing data, finds patterns in the testing data using the updated learned parameters, and outputs an inference;

calculating, by the data processing system, performance of the fully federated algorithm in providing the inference;

determining, by the data processing system, whether the performance of the fully federated algorithm satisfies an algorithm termination criteria;

when the performance of the fully federated algorithm does not satisfy the algorithm termination criteria, replacing, by the data processing system, each instance of the algorithm with the fully federated algorithm and re-executing the federated training workflow on each instance of the fully federated algorithm; and when the performance of the fully federated algorithm does satisfy the algorithm termination criteria, providing, by the data processing system, the performance of the fully federated algorithm and the aggregated parameters to an algorithm developer of the algorithm.

16. The computer-program product of claim 15, wherein the identifying the plurality of instances of the algorithm, comprises:

receiving, at the data processing system, the algorithm and input data requirements associated with the algorithm, wherein the input data requirements include optimization and/or validation selection criteria for data assets to be run on the algorithm;

identifying, by the data processing system, the data assets as being available from the one or more data hosts based on the optimization and/or validation selection criteria for the data assets;

curating, by the data processing system, the data assets within a data storage structure that is within infrastructure of each data host of the one or more data hosts; and splitting at least a portion of the data assets into the training data assets within the data storage structure that is within the infrastructure of each data host of the one or more data hosts.

17. The computer-program product of claim 16, wherein the algorithm and input data requirements are received from the algorithm developer, which is a different entity from the one or more data hosts, and the optimization and/or validation selection criteria define characteristics, formats and requirements for data assets to be run on the algorithm.

18. The computer-program product of computer-program product 15, wherein the federated training workflow further comprises encrypting the training gradients, and the integrating comprises decrypting the training gradients.

19. The computer-program product of claim 15, wherein the actions further comprise:

when the performance of the fully federated algorithm does satisfy the algorithm termination criteria, transmitting, by the data processing system, aggregated parameters to each instance of the algorithm; and executing, by the data processing system, an update training workflow on each instance of the algorithm, wherein the update training workflow updates the learned parameters with the aggregated parameters, and outputs one or more updated and trained instances of the algorithm.

20. The computer-program product of claim 19, wherein the actions further comprise running, by the data processing system, a remainder of the data assets through each instance of the algorithm.

* * * * *

UNITED STATES PATENT AND TRADEMARK OFFICE
CERTIFICATE OF CORRECTION

Page 1 of 1

PATENT NO. : 11,748,633 B2
APPLICATION NO. : 17/988664
DATED : September 5, 2023
INVENTOR(S) : Rachael A. Callcut et al.

It is certified that error appears in the above-identified patent and that said Letters Patent is hereby corrected as shown below:

On the Title Page

In the item (54) and in the Specification, Column 1, Lines 1-2, please change the title from:
DISTRIBUTED PRIVACY-PRESERVING COMPUTING
To:
DISTRIBUTED PRIVACY-PRESERVING COMPUTING ON PROTECTED DATA Signed and Sealed this
Twenty-fourth Day of December, 2024

Derrick Brent
*Acting Director of the United States Patent and Trademark Office*